United States Patent
Kanaya et al.

(10) Patent No.: US 7,779,535 B2
(45) Date of Patent: Aug. 24, 2010

(54) METHOD OF MANUFACTURING A THIN-FILM MAGNETIC HEAD WITH A MAGNETORESISTIVE EFFECT ELEMENT

(75) Inventors: Takayasu Kanaya, Tokyo (JP); Kazuki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 747 days.

(21) Appl. No.: 11/563,086

(22) Filed: Nov. 24, 2006

(65) Prior Publication Data

US 2007/0127165 A1 Jun. 7, 2007

(30) Foreign Application Priority Data

Dec. 2, 2005 (JP) ............................ 2005-349359

(51) Int. Cl.
*G11B 5/127* (2006.01)
*H04R 31/00* (2006.01)

(52) U.S. Cl. .............. 29/603.16; 29/603.07; 29/603.13; 29/603.15; 29/603.18; 216/62; 216/65; 216/66; 360/121; 360/122; 360/317; 360/324.11; 360/324.12; 451/5; 451/41

(58) Field of Classification Search .............. 29/603.07, 29/603.09, 603.13–603.16, 603.18; 360/121, 360/122, 316, 324.1, 324.11, 324.12; 427/127–131; 216/62, 65, 66

See application file for complete search history.

(56) References Cited

U.S. PATENT DOCUMENTS

| 6,381,107 | B1 | 4/2002 | Redon et al. |
| 6,783,635 | B2 * | 8/2004 | Pinarbasi ............... 204/192.11 |
| 6,924,048 | B2 * | 8/2005 | Kanbe et al. ................ 428/826 |

FOREIGN PATENT DOCUMENTS

| JP | 5-275769 | 10/1993 |
| JP | 2004-265517 | 9/2004 |
| JP | 2005-50418 | 2/2005 |

\* cited by examiner

*Primary Examiner*—Paul D Kim
(74) *Attorney, Agent, or Firm*—Oblon, Spivak, McClelland, Maier & Neustadt, L.L.P.

(57) ABSTRACT

An MR effect element that can obtain the sufficient back flux-guide effect under the condition of reducing the capacitance between the upper and lower electrode layers is provided. The element comprises: an MR effect multilayer provided on the lower electrode layer; an insulating layer surrounding a rear side surface and side surfaces opposed to each other in track width direction of the MR effect multilayer; and an upper electrode layer provided on the MR effect multilayer and the insulating layer, the insulating layer having a concave portion filled with a portion of the upper electrode layer, the concave portion positioned near the rear side surface of the MR effect multilayer, and a bottom point of a concave of the concave portion positioned at the same level or a lower level in stacking direction compared to an upper surface of the free layer.

6 Claims, 15 Drawing Sheets

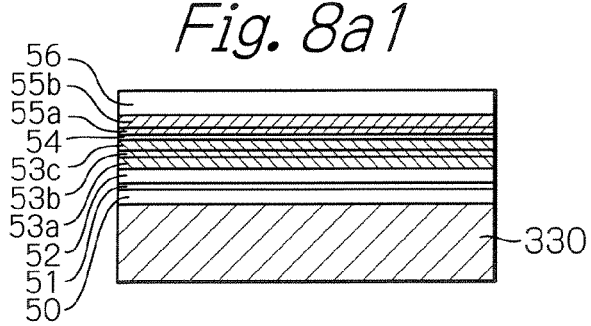
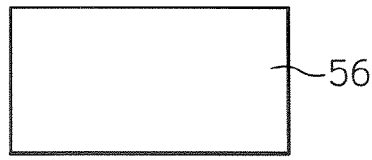
Fig. 8a1    Fig. 8a2
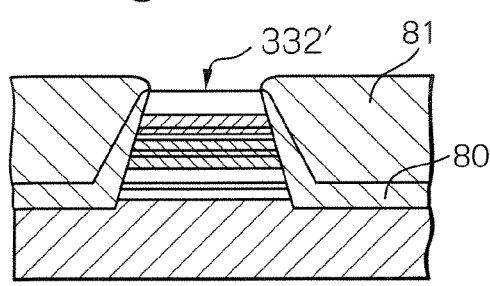
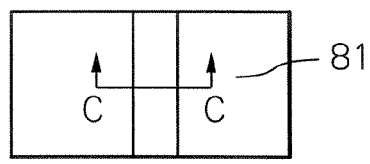
Fig. 8b1    Fig. 8b2
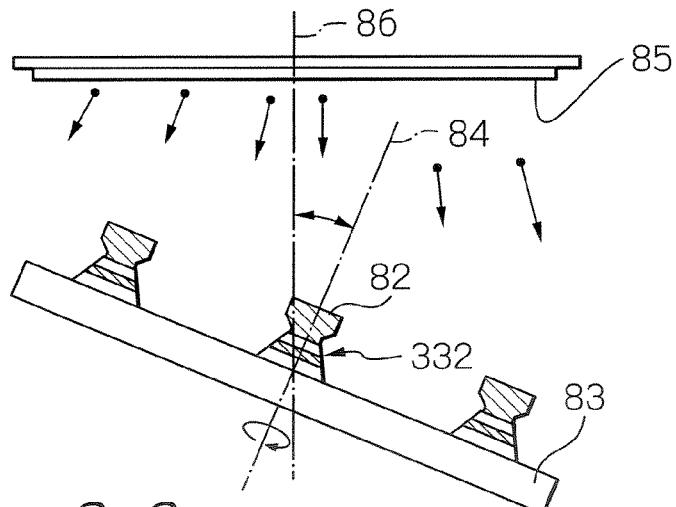
Fig. 8c1
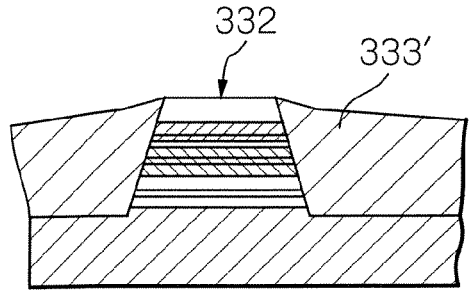
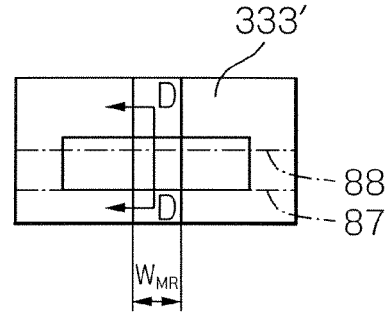
Fig. 8c2    Fig. 8c3

Fig. 10a1
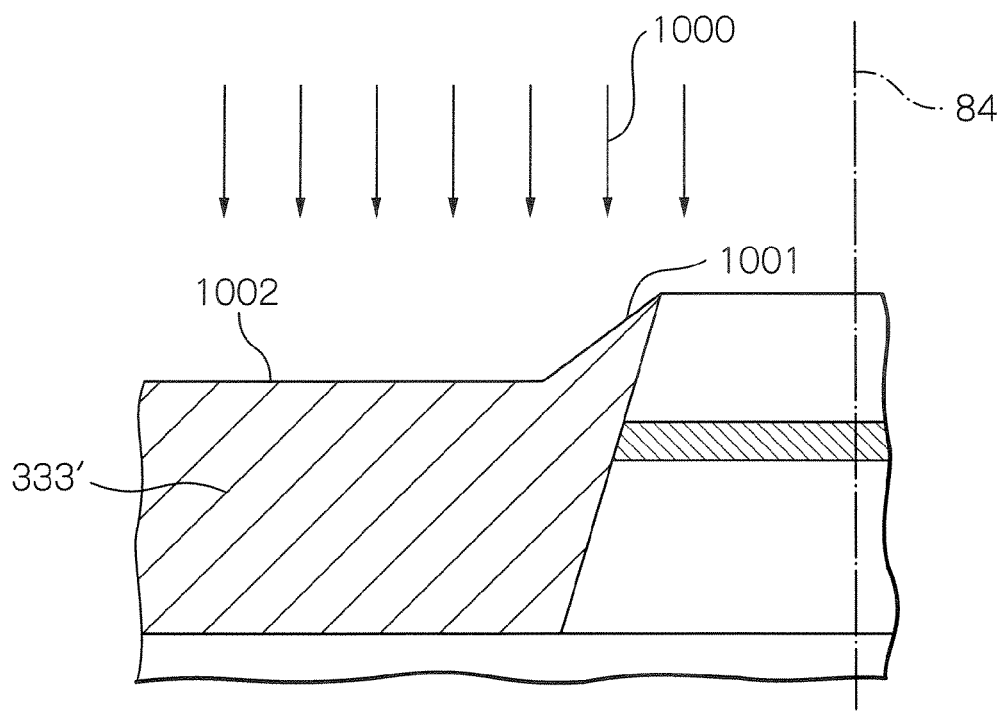
Fig. 10a2
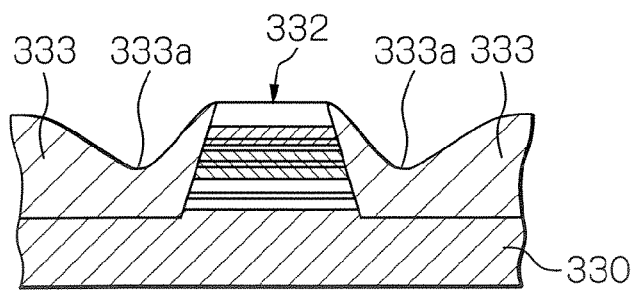
Fig. 10a3
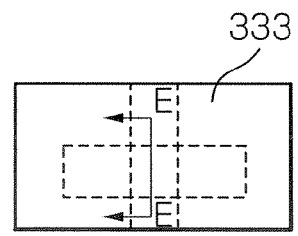
Fig. 10b1
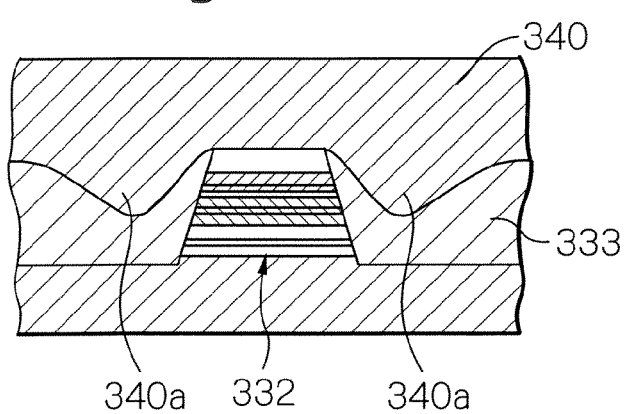
Fig. 10b2
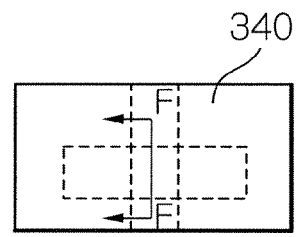

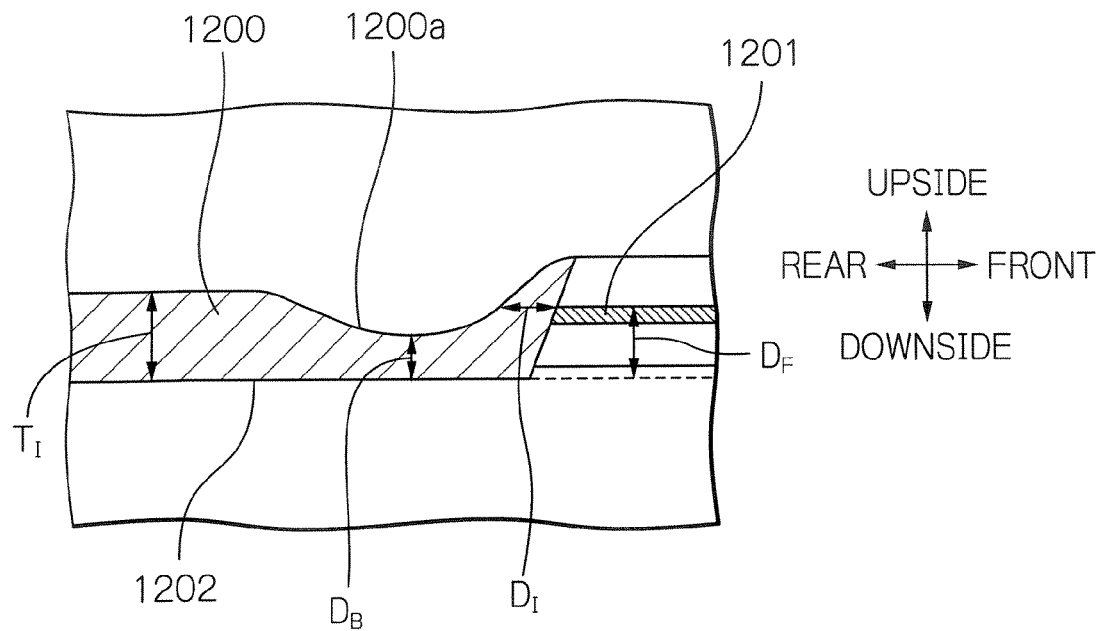
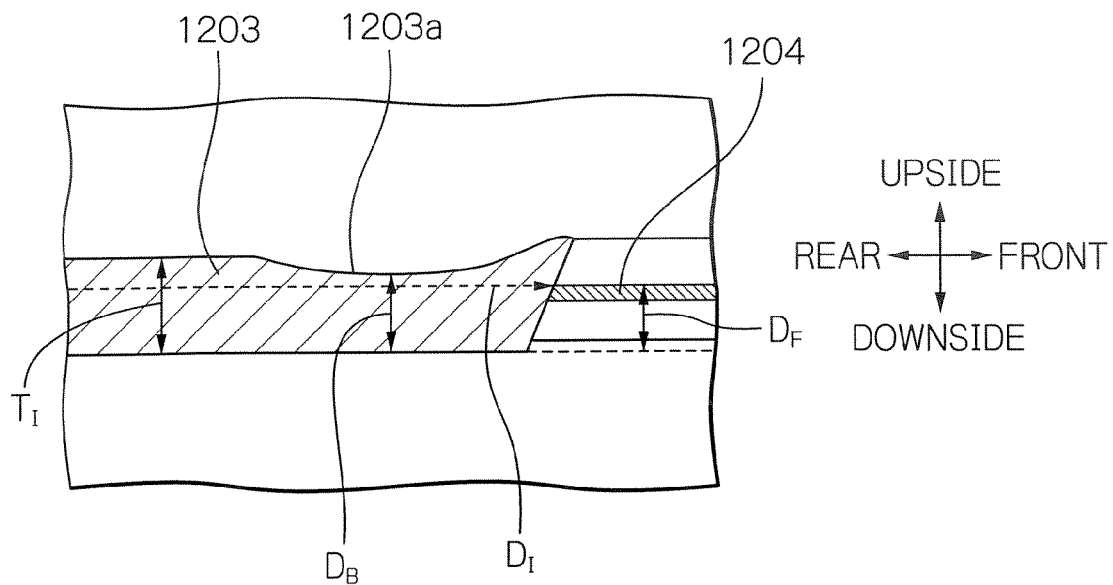

METHOD OF MANUFACTURING A THIN-FILM MAGNETIC HEAD WITH A MAGNETORESISTIVE EFFECT ELEMENT

PRIORITY CLAIM

This application claims priority from Japanese patent application No. 2005-349359, filed on Dec. 2, 2005, which is incorporated herein by reference.

BACKGROUND OF THE INVENTION

1. Field of the Invention

The present invention relates to a magnetoresistive (MR) effect element for detecting external magnetic fields such as signal fields and showing the resistance change corresponding to the field intensity, a thin-film magnetic head having the MR effect element, a head gimbal assembly (HGA) having the thin-film magnetic head and a magnetic disk drive apparatus having the HGA. Further, the present invention relates to a manufacturing method of a thin-film magnetic head wafer and a thin-film magnetic head having the MR effect element.

2. Description of the Related Art

Responding to larger capacity storage and further miniaturization of a magnetic disk drive apparatus in recent days, a giant magnetoresistive (GMR) head is being aggressively improved, which has a read head element utilizing a GMR effect and shows high sensitivity and high output. Furthermore, responding to much higher density recording, a tunnel magnetoresistive (TMR) head is under intense development, which has a read head element utilizing a TMR effect that is expected to show two times or more larger MR ratio than that of the GMR effect.

The structures of the TMR head and the commonly used GMR head are different from each other due to the difference in the flow direction of sense currents. While the commonly used GMR head has a current-in-plane (CIP) structure in which a sense current flows in the direction parallel to the stacking plane of the MR effect multilayer, the TMR head has a current-perpendicular-to-plane (CPP) structure in which a sense current flows in the direction perpendicular to the stacking plane. Recently, a GMR head having the CPP structure (CPP-type GMR head (CPP-GMR head)) is also developed as described in Japanese patent Publication No. 05-275769A. As the CPP-GMR head, developed is a head having a spin-valve magnetic multilayer film such as, for example, a specular-type magnetic multilayer film or a dual spin-valve-type magnetic multilayer film, as is the case in the CIP-GMR head.

Currently, a serious problem occurs in the CIP structure that an insufficient insulation is likely to occur between the MR effect multilayer and magnetic shield layers due to narrowing the read-gap corresponding to higher density recording. On the contrary, the CPP structure uses the magnetic shield layers as electrodes and needs no insulating means between the MR effect multilayer and the magnetic shield layers. As a result, the CPP structure is free from the above problem of the CIP structure. Consequently, the CPP structure has a significant advantage over the CIP structure.

As just described, the CPP-GMR head and the TMR head has a structure in which the MR effect multilayer is sandwiched directly between upper and lower electrode layers also acting as shield layers. In the CPP structure, an insulating layer is provided so as to surround the side surfaces of the MR effect multilayer for the purpose of preventing a short-circuit of sense currents between the upper and lower electrode layers. However, the insulating layer sandwiched between the upper and lower electrode layers generates a corresponding capacitance which has a possibility to cause a degradation of the reading performance or a breakdown of the element through the influence of disturbance noise or electrostatic discharge (ESD) phenomenon, as shown, for example, Japanese patent Publication No. 2005-50418A. Therefore, in view of the suppression of the capacitance, the insulating layer is required to have larger thickness. Further, in the case where the upper and lower electrode layers has a large opposed area, the insulating layer is also required to have larger thickness to decrease the occurrence possibility of a short-circuit by pinholes in the insulating layer.

Further, in the CPP structure, U.S. Pat. No. 6,381,107 describes a technique in which a part of the shield layer is provided on the rear side of the MR effect multilayer, which plays a role as a back flux-guide for improving reading performance. FIG. 15 shows an embodiment described in U.S. Pat. No. 6,381,107. As shown in FIG. 15, an insulating layer 1501 is formed on a lower electrode layer 1500 and on the rear side surface of an MR effect multilayer 1503 to prevent a short-circuit between the lower electrode layer 1500 and the upper electrode layer 1502. In the embodiment, because the distance between the rear end of a free layer 1504 and the upper electrode layer 1502 acting as a back flux-guide becomes much smaller, a magnetic flux from a recording bit of the magnetic disk can easily reach the MR effect multilayer by being guided by the back flux-guide. As a result, the back flux-guide is expected to effect a sufficient resistance change corresponding to the intrinsic MR effect of the MR effect multilayer.

However, a conventional structure having the above described back flux-guide has a possibility of a degradation of reading performance or a breakdown of the element due to the increase in the above-described capacitance between the upper and lower electrode layers.

In the structure, in order to obtain the sufficient back flux-guide effect, the distance between the rear end of the free layer and the upper electrode layer is required to be smaller with the thickness of the insulating layer smaller. However, the structure of such a thin insulating layer is likely to cause the disturbance noise or the ESD phenomenon as described above, and has some possibility of a degradation of the reading performance or a breakdown of the element.

Meanwhile, it may be one of the measures against this problem to increase the thickness of the insulating layer 1501 only on the lower electrode layer 1500 under the condition of keeping the thickness on the rear side surface of the MR effect multilayer 1503. However, the thickness of the insulating layer 1501 on the lower electrode layer 1500 can not be set to a sufficiently large value under the restriction for obtaining the desired back flux-guide effect, which is difficult to reduce the capacitance effectively.

BRIEF SUMMARY OF THE INVENTION

Therefore, it is an object of the present invention to provide an MR effect element that can obtain the sufficient back flux-guide effect under the condition of reducing the capacitance between the upper and lower electrode layers, a thin-film magnetic head having this MR effect element, an HGA provided with this thin-film magnetic head and a magnetic disk drive apparatus provided with this HGA.

Further, it is another object of the present invention to provide a manufacturing method of a thin-film magnetic head wafer and a thin-film magnetic head having the above-described MR effect element.

Here, some terms will be defined before explaining the present invention. In a layered structure of elements formed on an element-formed surface of the substrate, a component that is closer to the element-formed surface than a standard layer is defined to be "below" or "lower" in relation to the standard layer, and a component that is in the stacking direction side of the standard layer is defined to be "above" or "upper" in relation to the standard layer.

Further, a back side of a component when viewing from an air bearing surface (ABS) side of the slider substrate is defined to be a "rear" side of the component, and the opposite side closer to the ABS than the component is defined to be a "front" side of the component. And surfaces of a layer or a multilayer that are sandwiched between the "upper" surface and the "lower" surface of the layer or the multilayer is defined to be "side" surfaces.

According to the present invention, an MR effect element is provided, which comprises: a lower electrode layer; an MR effect multilayer provided on the lower electrode layer, and having a non-magnetic intermediate layer, and a pinned layer and a free layer between which the non-magnetic intermediate layer is sandwiched; an insulating layer surrounding a rear side surface and side surfaces opposed to each other in track width direction of the MR effect multilayer; and an upper electrode layer provided on the MR effect multilayer and the insulating layer, the insulating layer having a concave portion filled with a portion of the upper electrode layer, the concave portion positioned near the rear side surface of the MR effect multilayer, and a bottom point of a concave of the concave portion positioned at the same level or a lower level in stacking direction compared to an upper surface of the free layer.

In the MR effect element according to the present invention, a distance $D_B$ in the stacking direction from a lower surface of the insulating layer to the bottom point of the concave of the concave portion is preferably 18 nm (nanometers) or more. And a distance $D_f$ in the rear-front direction from a rear end of the upper surface of the free layer to the concave surface of the concave portion is preferably in a region from 3 nm to 50 nm.

Further, in the MR effect element according to the present invention, the MR effect multilayer is a current-perpendicular-to-plane-type giant MR (CPP-GMR) effect multilayer or a tunnel MR (TMR) effect multilayer.

In the above-described MR effect element, the concave portion filled with a portion of the upper electrode layer has a bottom provided at a sufficiently lower position, and is provided near the rear end of the upper surface of the free layer. As a result, a sufficient back flux-guide effect can be obtained. Further, a sufficient thickness of the insulating layer except the concave portion enables the capacitance between the upper and lower electrode layers to be reduced. Therefore, the ESD phenomenon and the disturbance noise can be avoided, and the reading performance can be improved under the condition of avoiding the breakdown of the element.

According to the present invention, a thin-film magnetic head is further provided, which comprises at least one MR effect element above-described for reading data signals.

According to the present invention, an HGA is further provided, which comprises: the above-described thin-film magnetic head; and a support mechanism for supporting the thin-film magnetic head.

According to the present invention, a magnetic disk drive apparatus is further provided, which comprises: at least one HGA above-described; at least one magnetic disk; and a recording/reproducing means for controlling read and write operations of the thin-film magnetic head to the at least one magnetic disk.

According to the present invention, a manufacturing method of a thin-film magnetic head wafer is further provided, which comprises steps of: forming, on a lower electrode layer, a MR effect multilayer having a non-magnetic intermediate layer, and a pinned layer and a free layer between which the non-magnetic intermediate layer is sandwiched, by etching with a resist pattern as masks; depositing an insulating film on the lower electrode layer and a side surface of the MR effect multilayer by a sputtering, during rotating a wafer substrate on which the photoresist pattern lies around a center axis extending in a direction perpendicular to an element-formed surface of the wafer substrate, the center axis tilted with a predetermined angle in relation to a normal line to a surface of the sputtering target; etching the insulating film by a means including an ion beam etching and/or a reverse sputtering to form an insulating layer having a concave portion near the side surface of the MR effect multilayer; and forming an upper electrode layer on the insulating layer including the concave portion and the MR effect multilayer.

In the manufacturing method according to the present invention, the predetermined angle is in a range from 20° (degrees) to 60°. And the insulating film is preferably made of an $Al_2O_3$ (alumina) or a $SiO_2$ (silicon dioxide).

According to the present invention, a manufacturing method of a thin-film magnetic head wafer is further provided, which comprises steps of: forming, on a lower electrode layer, a MR effect multilayer having a non-magnetic intermediate layer, and a pinned layer and a free layer between which the non-magnetic intermediate layer is sandwiched, by etching with a resistpattern as masks; depositing an insulating film on the lower electrode layer and a side surface of the MR effect multilayer by a chemical vapor deposition (CVD) technique; etching the insulating film by a means including an ion beam etching and/or a reverse sputtering to form an insulating layer having a concave portion near the side surface of the MR effect multilayer; and forming an upper electrode layer on the insulating layer including the concave portion and the MR effect multilayer.

In the manufacturing method according to the present invention, the insulating film is preferably made of $Al_2O_3$ or a $SiO_2$.

According to the present invention, a manufacturing method of a thin-film magnetic head is further provided, which comprises steps of: forming the above-described thin-film magnetic head wafer; cutting the thin-film magnetic head wafer into row bars on which a plurality of thin-film magnetic heads is aligned; polishing the row bar for adjusting an MR height; and cutting the polished row bar into individual thin-film magnetic heads.

In the manufacturing method according to the present invention, the predetermined angle is preferably in a range from 20° to 60°. And the insulating film is preferably made of $Al_2O_3$ or a $SiO_2$.

According to the present invention, a manufacturing method of a thin-film magnetic head is further provided, which comprises steps of: forming the above-described thin-film magnetic head wafer; cutting the thin-film magnetic head wafer into row bars on which a plurality of thin-film magnetic heads is aligned; polishing the row bar for adjusting an MR height; and cutting the polished row bar into individual thin-film magnetic heads.

In the manufacturing method according to the present invention, the insulating film is preferably made of $Al_2O_3$ or a $SiO_2$.

In the above-described manufacturing method, a concave portion, which is filled with a portion of the upper electrode layer and has a bottom provided at a sufficiently lower position and is provided near the rear end of the upper surface of the free layer, can be formed. Further, an insulating layer can be formed in which a sufficient thickness is secured except the concave portion. As a result, a thin-film magnetic head can be manufactured, which has the MR effect element that can obtain the sufficient back flux-guide effect under the condition of reducing the capacitance between the upper and lower electrode layers.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL VIEWS OF THE DRAWINGS

FIG. 7 shows cross-sectional views taken along line A-A in FIG. 3 explaining an embodiment of manufacturing steps of the MR effect element and the electromagnetic coil element shown in FIG. 4a;

FIGS. 8a1 to 8c3 show cross-sectional views and plain views illustrating an embodiment of the manufacturing steps of the MR effect multilayer and the insulating layer according to the present invention;

FIGS. 10a1 to 10b2 show cross-sectional views and plain views illustrating an embodiment of the manufacturing steps of the MR effect multilayer and the insulating layer according to the present invention;

FIGS. 12a and 12b show cross-sectional views explaining distance parameters defining the position and the size of the concave portion in the practical examples of the MR effect element according to the present invention and the comparative examples;

DETAILED DESCRIPTION OF THE INVENTION

Figure 1:
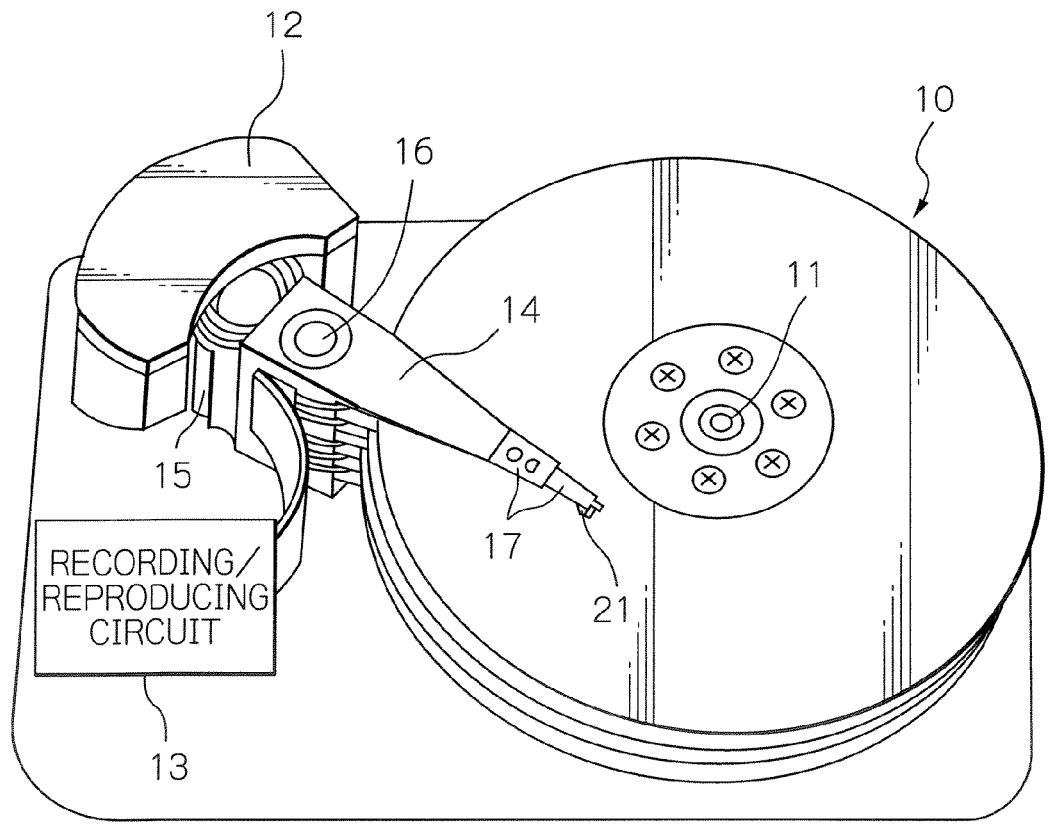
FIG. 1 shows a perspective view schematically illustrating a major portion of an embodiment of the magnetic disk drive apparatus according to the present invention.

FIG. 1 shows a perspective view schematically illustrating a major portion of an embodiment of the magnetic disk drive apparatus according to the present invention.

In FIG. 1, reference numeral 10 indicates a plurality of magnetic disks rotating around a rotational axis of a spindle motor 11, 12 indicates an assembly carriage device for positioning a thin-film magnetic head (slider) 21 on a track, and 13 indicates a recording/reproducing circuit for controlling read/write operations of the thin-film magnetic head, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. The thin-film magnetic head 21 is mounted on each HGA 17 in such a way as to face the surface of each magnetic disk 10. The each number of the magnetic disks 10, the drive aims 14, the HGAs 17 and the thin-film magnetic heads 21 may also be only one.

The recording/reproducing circuit 13 has, though not shown in the figure, a control LSI, a write gate for receiving recording data from the control LSI, a write circuit for outputting write currents corresponding to the recording data from the write gate, to a electromagnetic coil element for writing data signals as described later, a constant current circuit for supplying sense currents to an MR effect element for reading data signals as described later, an amplifier for amplifying output voltages of the MR effect element, and a demodulator circuit for outputting reproduced data to the control LSI.

Figure 2:
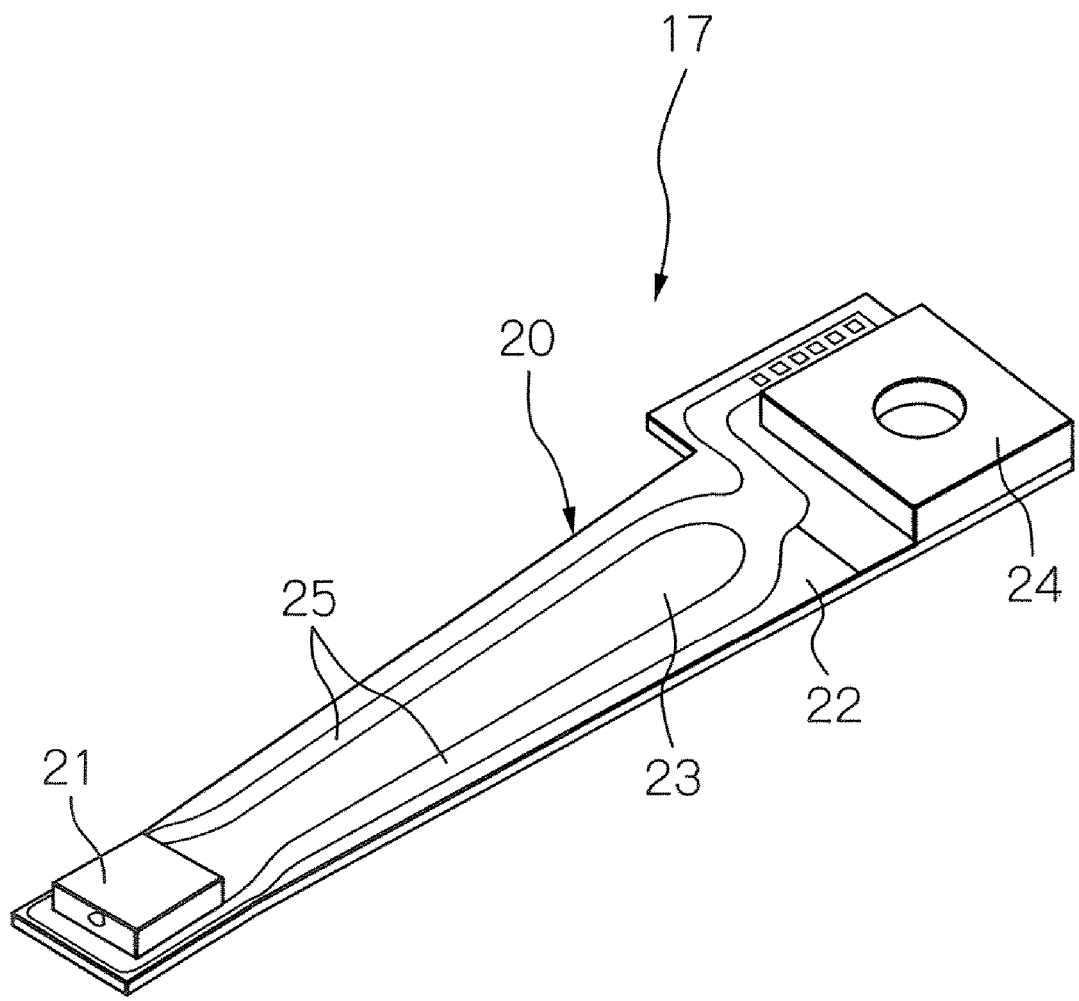
FIG. 2 shows a perspective view schematically illustrating an embodiment of the HGA according to the present invention.

FIG. 2 shows a perspective view schematically illustrating an embodiment of the HGA according to the present invention.

As shown in FIG. 2, the HGA 17 is constructed by fixing a thin-film magnetic head (slider) 21 on the end portion of a suspension 20 and by electrically connecting one end of a wiring member 25 to signal electrodes of the head 21.

The suspension 20 is a support mechanism for supporting the thin-film magnetic head 21, and is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23. It is evident that the structure of the suspension in the HGA according to the present invention is not limited to the above-described one. Though not shown in the figure, it is also possible to attach a head drive IC chip at some midpoint of the suspension 20.

Figure 3:
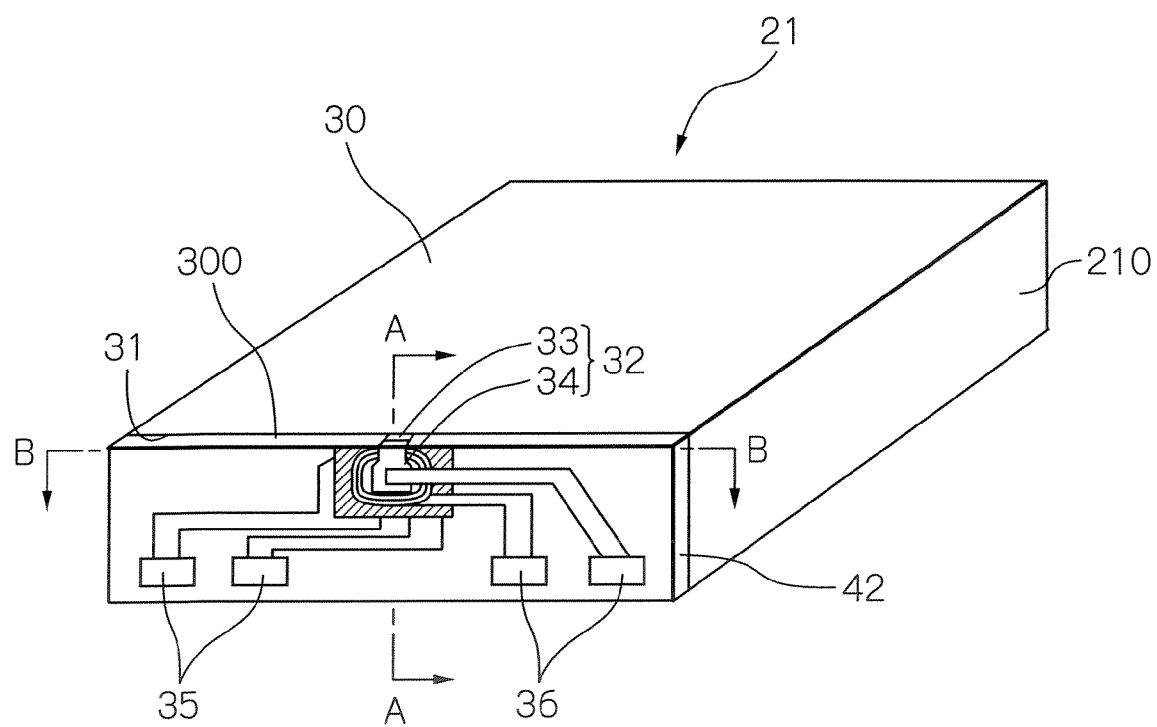
FIG. 3 shows a perspective view schematically illustrating an embodiment of the thin-film magnetic head provided on the end portion of the HGA shown in FIG. 2.

FIG. 3 shows a perspective view schematically illustrating an embodiment of the thin-film magnetic head provided on the end portion of the HGA shown in FIG. 2.

As shown in FIG. 3, the thin-film magnetic head (slider) 21 has a slider substrate 210 with an ABS 30 formed so as to obtain an appropriate flying height, a magnetic head element 32 formed on an element-formed surface 31 of the slider substrate 210, two sets of two signal electrodes 35 and 36 exposed on the surface of an overcoat layer 42 formed on the element-formed surface 31. The magnetic head element 32 includes an MR effect element 33 and an electromagnetic coil element 34. The two signal electrodes 35 are connected with the MR effect element 33, and the other two signal electrodes 36 are connected with the electromagnetic coil element 34.

One ends of the MR effect element 33 and the electromagnetic coil element 34 reach a head end surface 300 on the side of the ABS 30. During write and read operations, the thin-film magnetic head 21 hydrodynamically flies with a predetermined flying height on the rotating magnetic disk, and the MR effect element 33 reads data signals by sensing signal fields from the magnetic disk and the electromagnetic coil element 34 writes data signals by applying signal fields to the magnetic disk, the one ends of the elements being opposed to the surface of the magnetic disk.

Figure 4A:
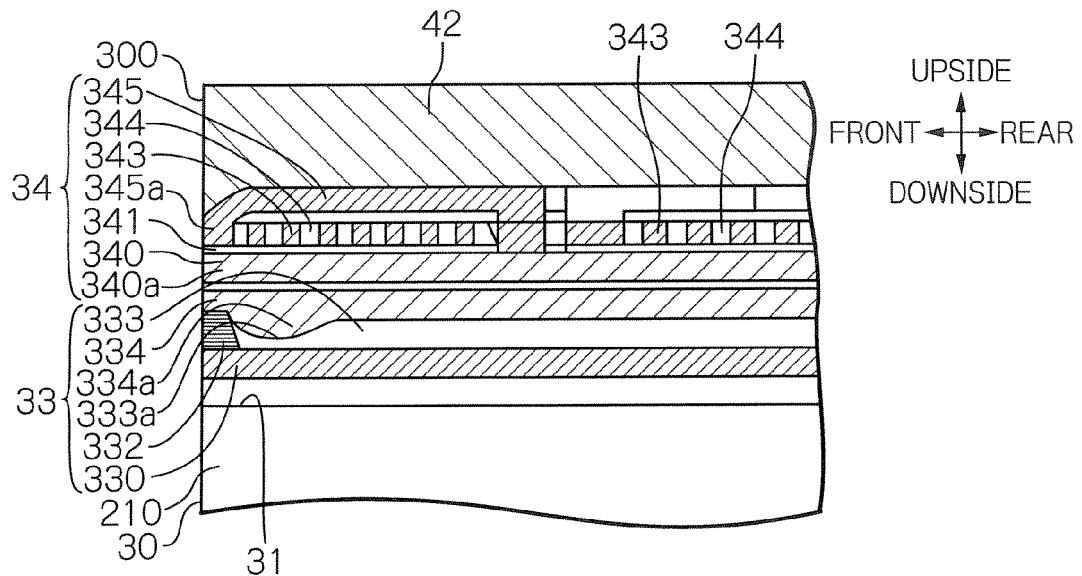
FIG. 4a shows a cross-sectional view taken along the line A-A in FIG. 3 illustrating a major portion of an embodiment of the thin-film magnetic head for longitudinal magnetic recording according to the present invention.
Figure 4B:
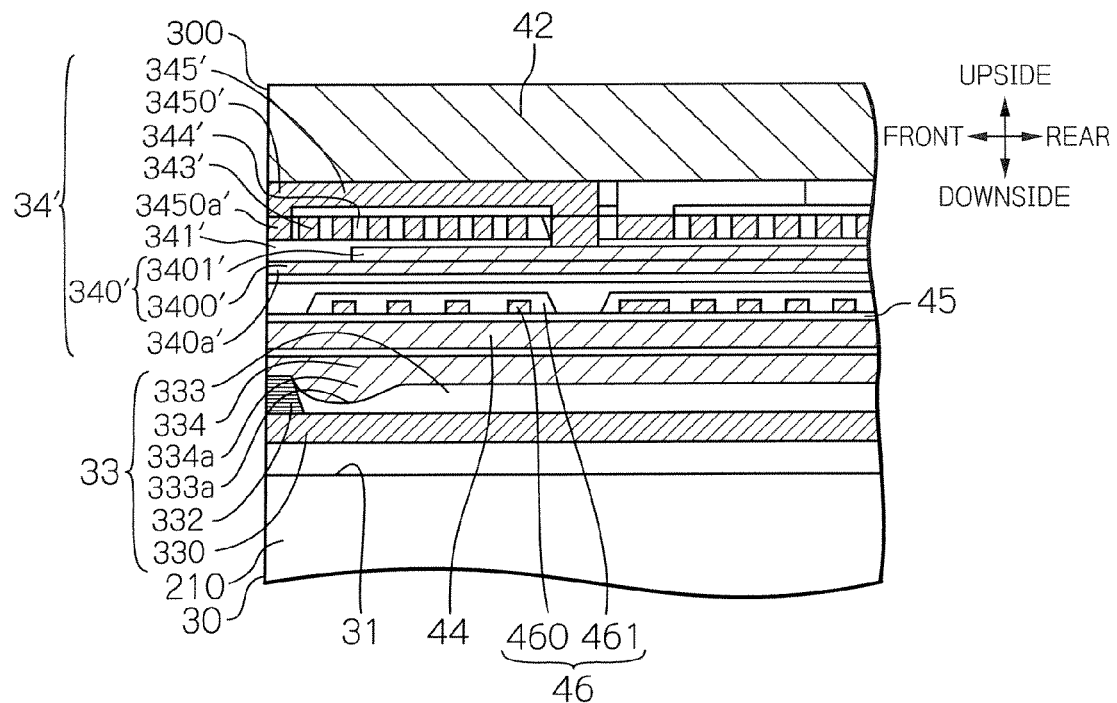
FIG. 4b shows a cross-sectional view taken along the line A-A in FIG. 3 illustrating a major portion of an embodiment of the thin-film magnetic head for perpendicular magnetic recording according to the present invention.

FIG. 4a shows a cross-sectional view taken along the line A-A in FIG. 3 illustrating a major portion of an embodiment of the thin-film magnetic head for longitudinal magnetic recording according to the present invention, and FIG. 4b shows a cross-sectional view taken along the line A-A in FIG. 3 illustrating a major portion of an embodiment of the thin-film magnetic head for perpendicular magnetic recording according to the present invention. In FIG. 4b, components corresponding to the components shown in FIG. 4a are designated with the same reference numerals as those in FIG. 4a, and the explanations of their structures are omitted.

In FIG. 4a, the ABS 30 is a surface of the slider substrate 210 opposed to the surface of the magnetic disk, and the element-formed surface 31 is a side surface of the slider substrate 210 when the ABS 30 is set to a bottom. The MR effect element 33, the electromagnetic coil element 34 and the overcoat layer 42 covering these elements are mainly formed on/above the element-formed surface 31.

The MR effect element 33 includes an MR effect multilayer 332, an insulating layer 333 surrounding the left and right side surfaces opposed in the track width direction and the rear side surface of the MR effect multilayer 332, and a lower electrode layer 330 and an upper electrode layer 334 that are provided in positions between which the MR multilayer 332 and the insulating layer 333 are sandwiched. The MR effect multilayer 332 is a CPP-GMR effect multilayer or a TMR effect multilayer, and senses signal fields from the magnetic disk with very high sensitivity. The upper and lower electrode layers 334 and 330 are electrodes to be used for applying sense currents in the direction perpendicular to the stacking plane of the MR effect multilayer 332, and further play a role of shielding external magnetic fields that causes noise for the MR effect multilayer 332.

The insulating layer 333 has a concave portion 333a on the rear side of the MR effect multilayer 332, and the concave portion 333a is filled with a back flux-guide portion 334a that is a portion of the upper electrode layer 334. The bottom point (the lowest point of the concave) of the concave portion 333a is positioned at the same level or a lower level in the stacking direction (the direction perpendicular to the element-formed surface 31) compared to the upper surface of a free layer of the MR effect multilayer 332. This configuration including the insulating layer 333 with the concave portion 333a enables the distance between the back flux-guide portion 334a and the rear end of the upper surface of the free layer to be set to a very small value. As a result, a magnetic flux can easily reach the MR effect multilayer 332 by being guided by the back flux-guide portion 334a, that is, the back flux-guide effect can be obtained sufficiently.

Further, because the other portions of the insulating layer 333 except the concave portion 333a maintain a sufficient thickness, the capacitance between the upper and lower electrode layers 334 and 330 can be reduced, and the occurrence possibility of the short-circuit due to pinholes can become much lower. Therefore, the disturbance noise as well as the ESD phenomenon can be avoided, that is, the reading performance can be improved under the condition of avoiding the breakdown of the element. The size of the concave portion 333a and the positional relation between the concave portion 333a and the MR effect multilayer 332 will be explained layer.

The electromagnetic coil element 34 is for longitudinal magnetic recording in the present embodiment, and has a lower magnetic pole layer 340, a write gap layer 341, a write coil layer 343, a coil-insulating layer 344 and an upper magnetic pole layer 345. The upper and lower magnetic pole layers 345 and 340 are magnetic paths to guide the magnetic flux excited by currents flowing through the write coil layer 343. One end portions 345a and 340a pinch the end portion on the head end surface 300 side of the write gap layer 341. A write operation is performed to the magnetic disk for longitudinal magnetic recording by applying write fields as leakage magnetic fields at the end portion of the write gap layer 341. The ends on the magnetic disk side of the upper and lower magnetic pole layers 345 and 340 reach the head end surface 300, and the head end surface 300 is coated with diamond like carbon (DLC), etc. as an extremely thin protective film. The write coil layer 343 shown in FIG. 4a has a monolayer structure, however the write coil layer may have a two or more layered structure or a helical coil shape.

Further, a non-magnetic layer formed of an insulating material or a metal is provided between the upper electrode layer 334 and the lower magnetic pole layer 340 for the purpose of magnetically separating the MR effect element 33 from the electromagnetic coil element 34. However, the non-magnetic layer is not necessarily needed, and instead of the upper electrode layer 344, the non-magnetic layer and the lower magnetic pole layer 340, only one magnetic layer may be formed which serves as the two layers 344 and 340.

Next, another embodiment of the thin-film magnetic head according to the present invention will be explained.

In FIG. 4b, the electromagnetic coil element 34' is for perpendicular magnetic recording, and has a main magnetic pole layer 340', a gap layer 341' a write coil layer 343', a coil-insulating layer 344' and an auxiliary magnetic pole layer 345'. The main magnetic pole layer 340' is a magnetic path to converge and guide a magnetic flux excited by currents flowing through the write coil layer 343', and consists of a main pole principal layer 3400' and a main pole support layer 3401'. The length (thickness) in the stacking direction of the end portion 340a' in the head end surface 300 side of the main magnetic pole layer 340' becomes smaller than that of the other portions, the length of the end portion 340a' corresponding to the layer thickness of the main pole principal layer 3400'. As a result, the main magnetic pole layer 340' can generate fine write fields corresponding to higher density recording.

The end portion in the head end surface 300 side of the auxiliary magnetic pole layer 345' or a trailing shield portion 3450' has a larger length (thickness) in the stacking direction than that of the other portions. The trailing shield portion 3450' causes a magnetic field gradient between the end portion 3450a' of the trailing shield portion 3450' and the end portion 340a' of the main magnetic pole layer 340' to be steeper. As a result, a jitter of signal outputs becomes smaller, and therefore, an error rate during reading can be reduced.

Further, as shown in FIG. 4b, a shielding-between-elements layer 44 and a backing coil portion 46 are provided between the MR effect element 33 and the electromagnetic coil element 34'. The backing coil portion 46 has a baking coil layer 460 and a backing coil insulating layer 461, and suppresses a wide area adjacent-track erase (WATE) behavior, which is an unwanted write or erase operation to the magnetic disk, by generating a magnetic flux for negating the magnetic flux loop that arises from the electromagnetic coil element 34' through the upper and lower electrode layers of the MR effect element 33. The write coil layer 343' has a monolayer structure in FIG. 4b, however, may have a two or more layered structure or a helical coil shape.

Figure 5:
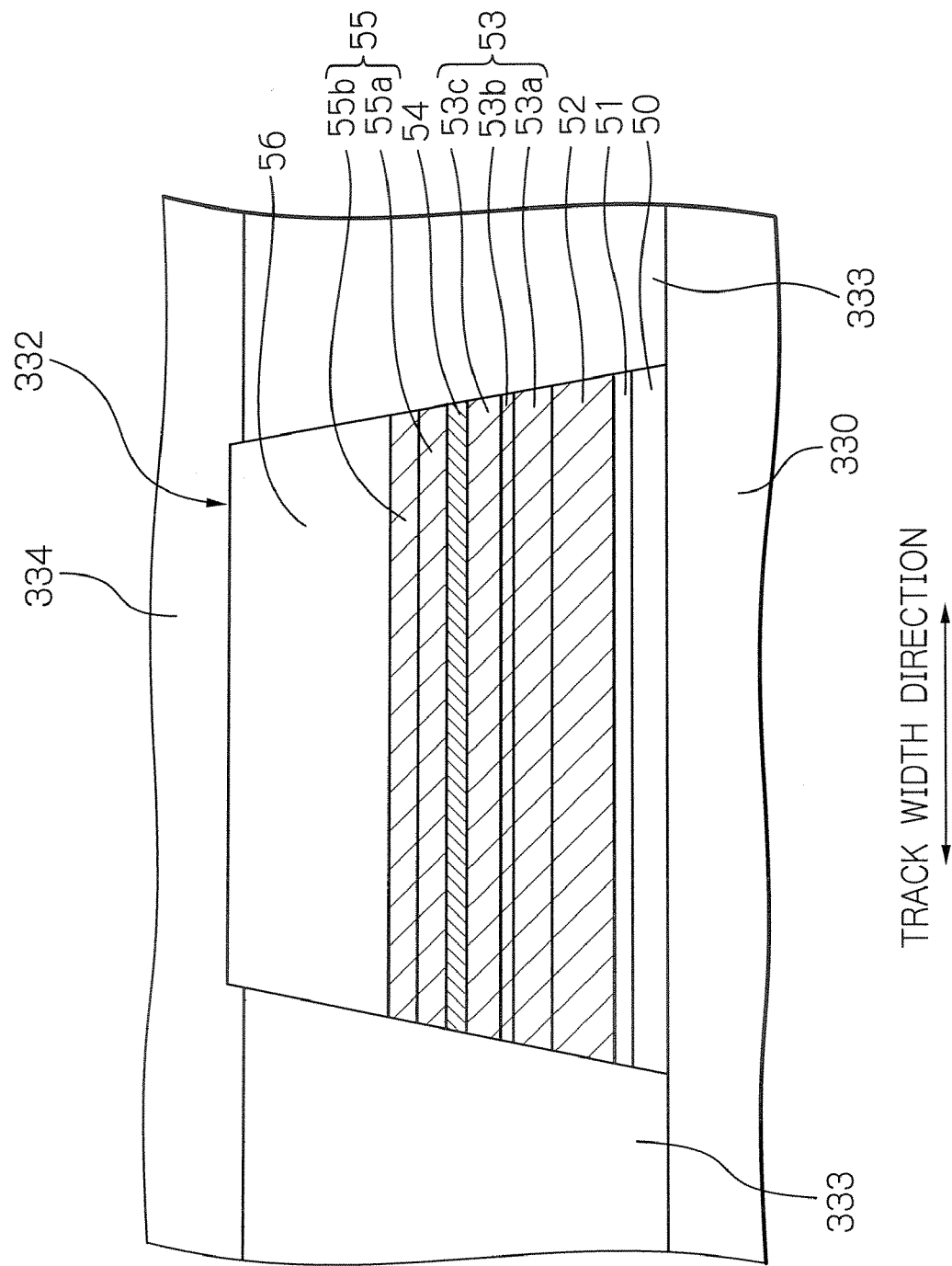
FIG. 5 shows a cross-section taken along the line B-B in FIG. 3 viewed from the head end surface side, schematically illustrating a layered structure of an embodiment of the MR multilayer.

FIG. 5 shows a cross-section taken along the line B-B in FIG. 3 viewed from the head end surface 300 side, schematically illustrating a layered structure of an embodiment of the MR multilayer 332.

In FIG. 5, the MR effect multilayer is a TMR effect multilayer, however, may be a CPP-GMR effect multilayer. Reference numeral 50 denotes a lower metal layer, 51 denotes a base layer, 52 denotes an antiferromagnetic layer, 53 denotes a pinned layer in which the direction of a magnetization is fixed, 54 denotes a tunnel barrier layer as a non-magnetic intermediate layer, 55 denotes a free layer in which the direction of a magnetization is not fixed, and 56 denotes an upper metal layer, respectively. Here, the lower metal layer 50 is formed on the lower electrode layer 330 to electrically connect the TMR effect multilayer 332 with the lower electrode layer 330. Further, the upper metal layer 56, on which the upper electrode layer 334 is formed, electrically connects the TMR effect multilayer 332 with the upper electrode layer 334. Therefore, during a read operation (during detecting signal fields), sense currents flow in the direction perpendicular to the surface of each stacked layer (the stacking surface) of the TMR effect multilayer 332. Furthermore, the insulating layer 333 is formed so as to surround the left and right side surfaces opposed in the track width direction and the rear side surface of the MR effect multilayer 332.

Further, as an alternative to a part of the insulating layer 333, side soft-magnetic layers may be provided on both sides in the track width direction of the pinned layer 53, the tunnel barrier layer 54 and the free layer 55 for absorbing noise fields from adjacent tracks. In that case, side insulating films are provided below the side soft-magnetic layers and at least between the side soft-magnetic layers and both end portions in the track width direction of the pinned layer 53 and the tunnel barrier layer 54. The side insulating films prevent sense currents from bypassing the tunnel barrier layer 54, which can efficiently provide the TMR output.

Furthermore, as another alternative to a part of the insulating layer 333, side hard-magnetic layers may be provided on both sides in the track width direction of the pinned layer 53, the tunnel barrier layer 54 and the free layer 55, for applying bias fields to the free layer 55 by means of a hard bias method. In that case, thin insulating layers are inserted between the side hard-magnetic layers and the MR effect multilayer 332. Moreover, as further another alternative, an in-stack bias multilayer in which a bias non-magnetic layer, a bias ferromagnetic layer and a bias antiferromagnetic layer are sequentially stacked, may be provided between the free layer 55 and the upper metal layer 56. This bias means promotes the stability of magnetic domains by applying exchange bias fields to the free layer 55.

The antiferromagnetic layer 52 is formed on the lower metal layer 50 through the base layer 51. The pinned layer 53 formed on the antiferromagnetic layer 52 has a multilayered structure, namely a synthetic-ferri-pinned structure in which a first ferromagnetic film 53a, a non-magnetic film 53b and a second ferromagnetic film 53c are sequentially stacked from the antiferromagnetic layer 52 side. The first ferromagnetic film 53a receives exchange bias fields due to the exchange interaction with the antiferromagnetic layer 52. As a result, the whole magnetization of the pinned layer 53 is stably fixed.

The free layer 55 formed on the tunnel barrier layer 54 has a multilayered structure in which a high polarizability film 55a and a soft-magnetic film 55b are sequentially formed on the tunnel barrier layer 54. The free layer 55, whose magnetization direction can change in response to applied signal fields, makes a ferromagnetic tunnel coupling together with the pinned layer 53 by using the tunnel barrier layer 54 as a barrier of the tunnel effect. When the magnetization direction of the free layer 55 changes in response to the signal fields, tunnel currents increase/decrease due to the variation in the state densities of up and down spin bands of the free layer 55, and therefore, the electric resistance of the MR multilayer 332 changes. The measurement of this resistance change enables weak and local signal fields to be surely detected with high sensitivity. Here, the high polarizability film 55a is not essentially necessary and therefore omissible. When the high polarizability film 55a is omitted, an MR ratio (a rate of resistance change) corresponding to the soft-magnetic film 55b having an interface with the tunnel barrier layer 54 is obtained.

Figure 6:
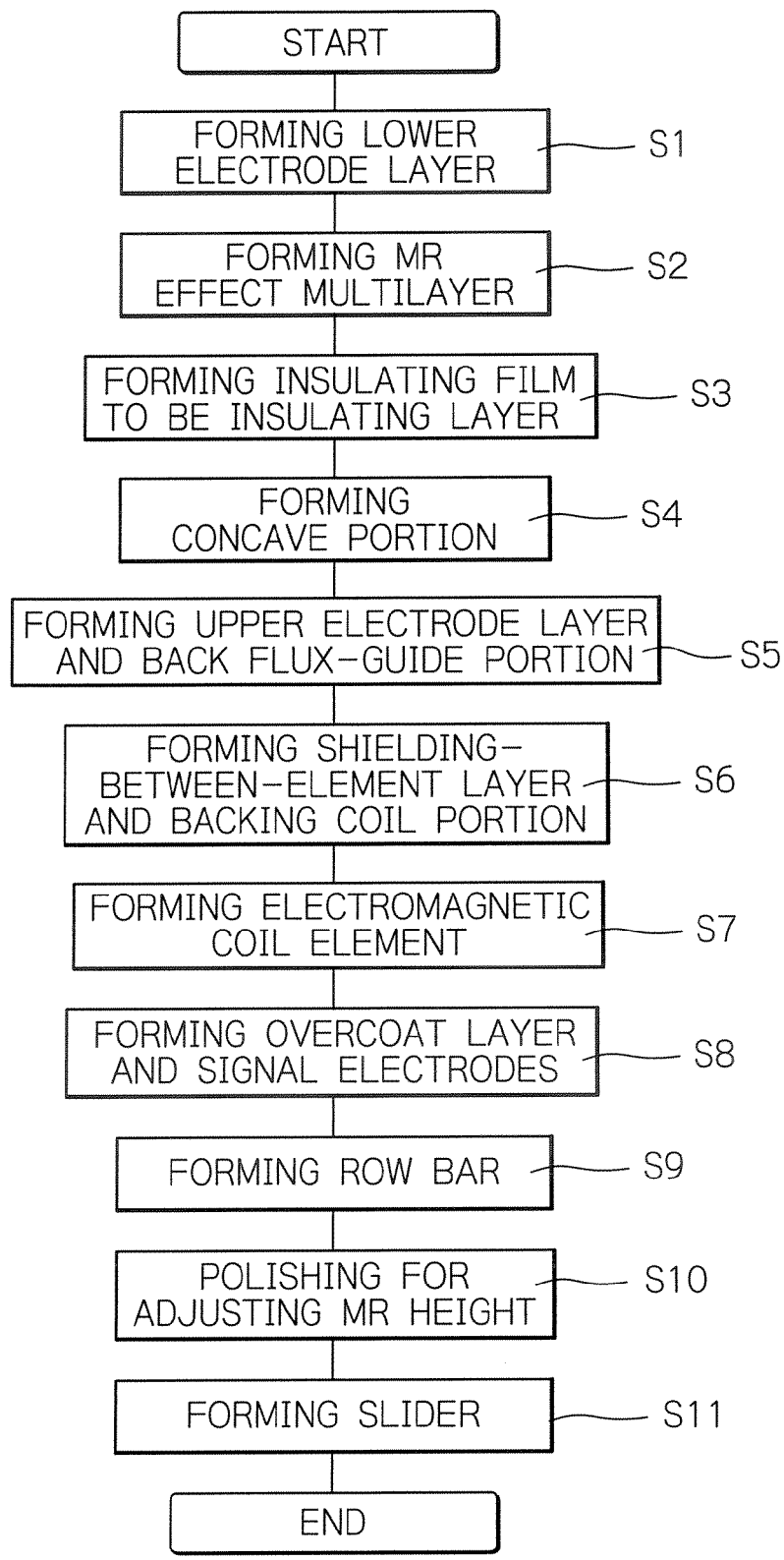
FIG. 6 shows a flow chart schematically illustrating an embodiment of the manufacturing method of the thin-film magnetic head according to the present invention.

FIG. 6 shows a flow chart schematically illustrating an embodiment of the manufacturing method of the thin-film magnetic head according to the present invention.

According to FIG. 6, first, a lower electrode layer is formed on the element-formed surface of a wafer substrate to be slider substrates (step S1), then an MR effect multilayer is formed (step S2), and then an insulating film to be the insulating layer is formed (step S3), further, a concave portion is formed on the insulating film to finish forming the insulating layer. Next, an upper electrode layer and a back flux-guide portion are formed (step S5) to complete the MR effect element. After that, in the case of the head for perpendicular magnetic recording, a shielding-between-elements layer and a backing coil portion are formed (step S6). Next, an electromagnetic coil element is formed (step S7), and then an overcoat layer and signal electrodes are formed (step S8), which completes a wafer substrate process, that is, finishes manufacturing a thin-film magnetic head water.

Next, the wafer substrate for which the above wafer substrate process is completed is cut into row bars on which a plurality of magnetic head elements is aligned (step S9). Then, in order to obtain a desired MR height, the row bar is polished for adjusting the MR height (step S10). After that, the polished row bar is cut and separated into individual sliders (thin-film magnetic heads) (step S11), which completes a manufacturing process of the thin-film magnetic head.

FIG. 7 shows cross-sectional views taken along line A-A in FIG. 3 explaining an embodiment of manufacturing steps of the MR effect element and the electromagnetic coil element shown in FIG. 4a.

Figure 7A:
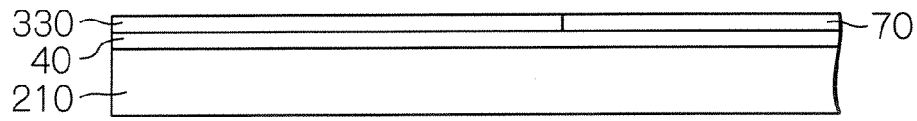

First, as shown in FIG. 7a, an insulating base layer 40 is formed of, for example, $Al_2O_3$(alumina) or $SiO_2$ (silicon dioxide) with thickness of approximately 0.1 μm (micrometer) to 5 μm, deposited on the slider substrate (wafer substrate) 210 made of AlTiC ($Al_2O_3$–TiC), etc., by means of, for example, a sputtering technique. Next, the lower electrode layer 330 is formed of, for example, NiFe, CoFeNi, CoFe, FeN, FeZrN or a multilayer of at least two selected from these alloys with thickness of approximately 0.5 μm to 3 μm on the insulating base layer 40, by means of, for example, a frame plating technique. Then, an insulating film made of, for example, $Al_2O_3$ or $SiO_2$ is deposited by means of, for example, a sputtering technique, and a planarizing layer 70 is formed by planarizing the insulating film by means of, for example, a chemical mechanical polishing (CMP) technique.

Figure 7B:
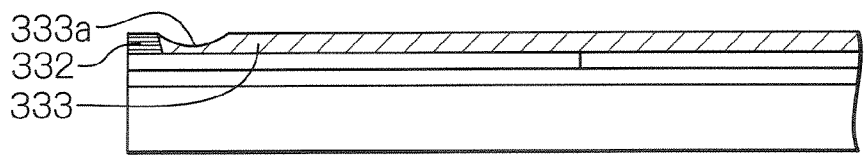

Next, as shown in FIG. 7b, formed are the MR effect multilayer 332 and the insulating layer 333 having the concave portion 333a. These forming steps are essential for the present invention, and will be explained later in detail.

Figure 7C:
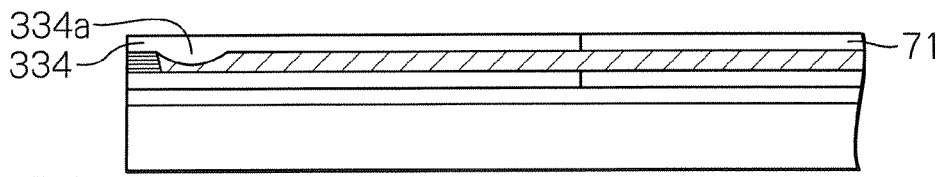

Next, as shown in FIG. 7c, the upper electrode layer 334 and the back flux-guide portion 334a are formed of, for example, NiFe, CoFeNi, CoFe, FeN, FeZrN or a multilayer of at least two selected from these alloys with thickness of approximately 0.5 μm to 3 μm, deposited on the insulating layer 333 with the concave portion 333a and the MR effect multilayer 332, by means of, for example, a frame plating technique. The MR effect element 33 is completed by finishing these manufacturing steps. After that, a planarizing layer 71 is formed by depositing an insulating film made of, for example, $Al_2O_3$ or $SiO_2$ using, for example, a sputtering technique and then by planarizing the insulating film by means of a CMP technique.

Figure 7D:
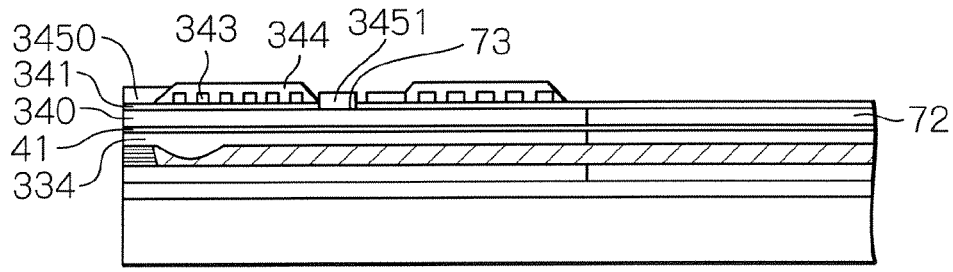

Next, as shown in FIG. 7d, a non-magnetic layer 41 is formed of an insulating material such as $Al_2O_3$, $SiO_2$, AlN or DLC or of a metal material such as Ti, Ta or Pt with thickness of approximately 0.1 μm to 0.5 μm, by means of, for example, a sputtering technique or a chemical vapor deposition (CVD) technique, for the purpose of magnetically separating the MR effect element 33 from an electromagnetic coil element 32 formed later. Then, the lower magnetic pole layer 340 is formed of, for example, NiFe, CoFeNi, CoFe, FeN, FeZrN or a multilayer of at least two selected from these alloys with thickness of approximately 0.5 μm to 3 μm, deposited on the non-magnetic layer 41, using, for example, a frame plate technique. After that, a planarizing layer 72 is formed by depositing an insulating film made of, for example, $Al_2O_3$ or $SiO_2$ using, for example, a sputtering technique and then by planarizing the insulating film by means of a CMP technique.

Next, also as shown in FIG. 7d, the write gap layer 341 is formed of an insulating material such as $Al_2O_3$, $SiO_2$, AlN or DLC with thickness of approximately 0.01 μm to 0.05 μm, by means of, for example, a sputtering technique or a CVD technique. After that, a back-gap portion 73 is formed as an exposed portion of the lower magnetic pole layer 340 by removing a portion of the write gap layer 341 using, for example, a dry etching technique such as a milling technique or a reactive ion etching (RIE) technique with resist mask patterns. Then, the write coil layer 343 is formed of, for example, Cu with thickness of approximately 1 μm to 5 μm, deposited on the write gap layer 341 by means of, for example, a frame plating technique.

Next, also as shown in FIG. 7d, the coil-insulating layer 344 is formed of, for example, a heat-cured resist such as a heat-cured novolak resist with thickness of approximately 0.5 μm to 7 μm, by means of, for example, a photolithographic method, so as to cover the write coil layer 343. Then, an upper magnetic pole 3450 and a back-contact magnetic pole 3451 are formed of, for example, NiFe, CoFeNi, CoFe, FeN, FeZrN or a multilayer of at least two selected from these alloys with thickness of approximately 0.5 μm to 3 μm, deposited on the write gap layer 431, by means of, for example, a frame plating technique.

Figure 7E:
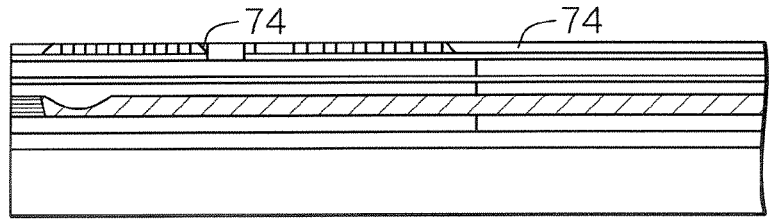
Figure 7F:
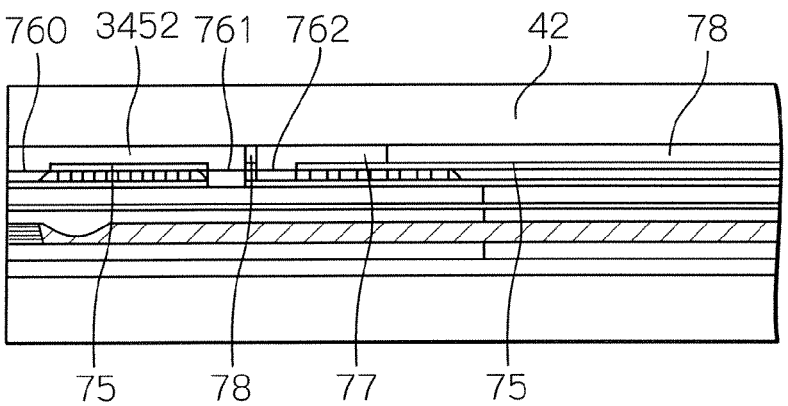

Then, as shown in FIG. 7e, a planarizing layer 74 is formed by depositing an insulating film made of, for example, $Al_2O_3$ or $SiO_2$ using, for example, a sputtering technique and then by planarizing the insulating film by means of a CMP technique. Next, as shown in FIG. 7f, an insulating layer 75 is formed of, for example, $Al_2O_3$ or $SiO_2$ by means of, for example, a sputtering technique or a CVD technique. After that, a portion 760 for connecting the upper magnetic pole and a yoke described later, a portion 761 for connecting the back-contact magnetic pole and the yoke, and a coil lead portion 762 are formed by exposing corresponding portions of the lower layers using, for example, a dry etching technique such as a milling technique or a RIE technique with resist mask patterns.

Next, as shown in FIG. 7f, a yoke layer 3452 and a coil lead layer 77 are formed of, for example, NiFe, CoFeNi, CoFe, FeN, FeZrN or a multilayer of at least two selected from these alloys with thickness of approximately 0.5 μm to 3 μm, by means of, for example, a frame plating technique. Here, the coil lead layer 77 may be formed of, for example, Cu by means of, for example, a frame plating technique in addition. After that, a trim milling process is performed to uniform widths in the track-width direction of the opposed ends through the write gap layer 341 of the upper magnetic pole 3450 and the lower magnetic pole layer 340. Here, the upper magnetic pole layer 345 is completed by finishing the upper magnetic pole 3450, the back-contact magnetic pole 3451 and the yoke layer 3452 through the above-described steps.

Next, a planarizing layer 78 is formed by depositing an insulating film made of, for example, $Al_2O_3$ or $SiO_2$ using, for example, a sputtering technique and then by planarizing the insulating film by means of a CMP technique. Then, the overcoat layer 42 is formed of, for example, $Al_2O_3$ or $SiO_2$ on the planarized surface by means of, for example, a sputtering technique. Through the above-described process, the manufacturing steps of the MR effect element and the electromagnetic coil element is completed.

The above-described manufacturing steps are used for the thin-film magnetic head for longitudinal magnetic recording shown in FIG. 4a. However, alternatives or other processes with different conditions are also possible to be used. Further, the thin-film magnetic head for perpendicular magnetic recording shown in FIG. 4b can also be manufactured by applying the above-described process.

Figure 9:
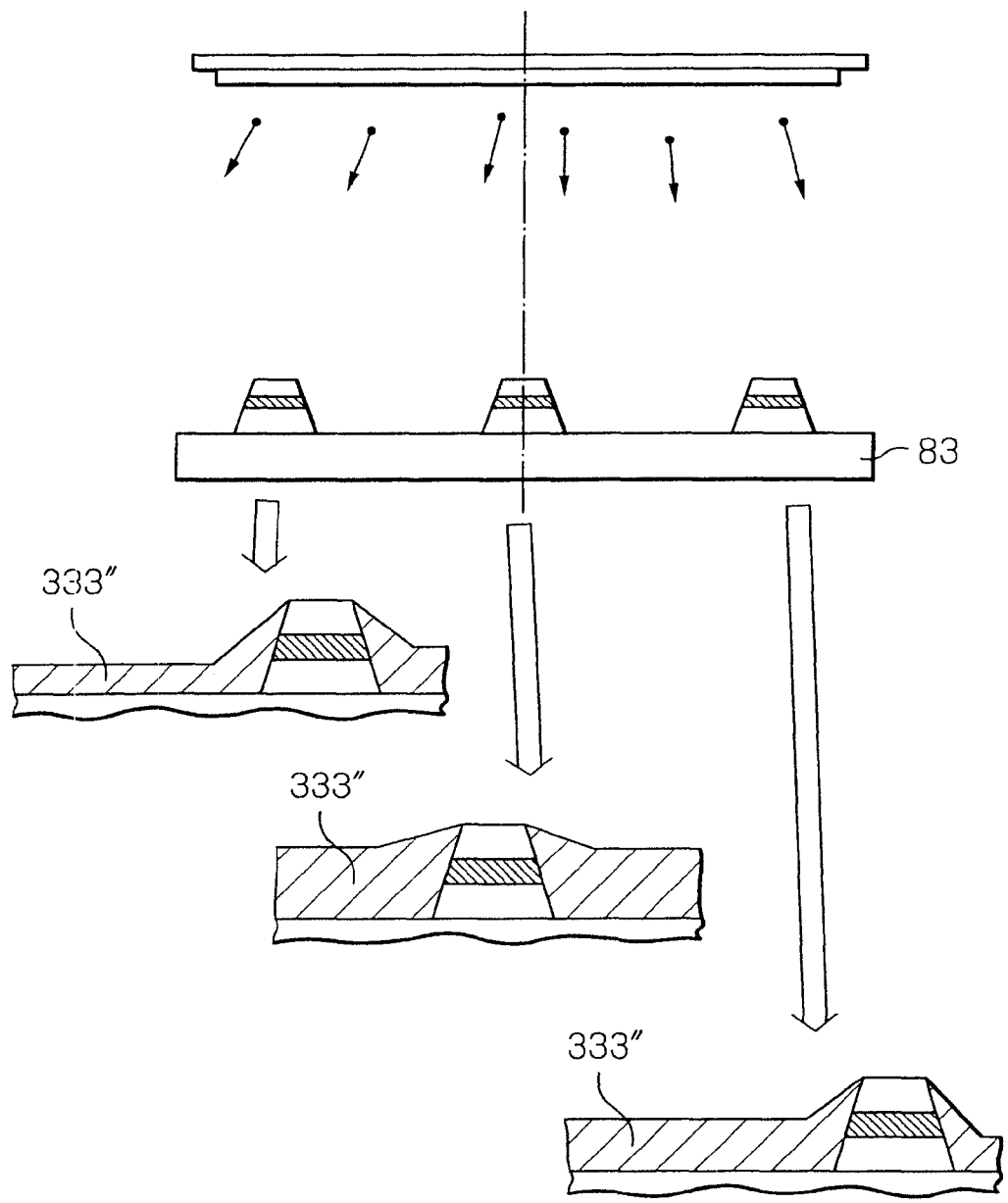
FIG. 9 shows a schematic view explaining the formation of the conventional insulating film.
Figure 11:
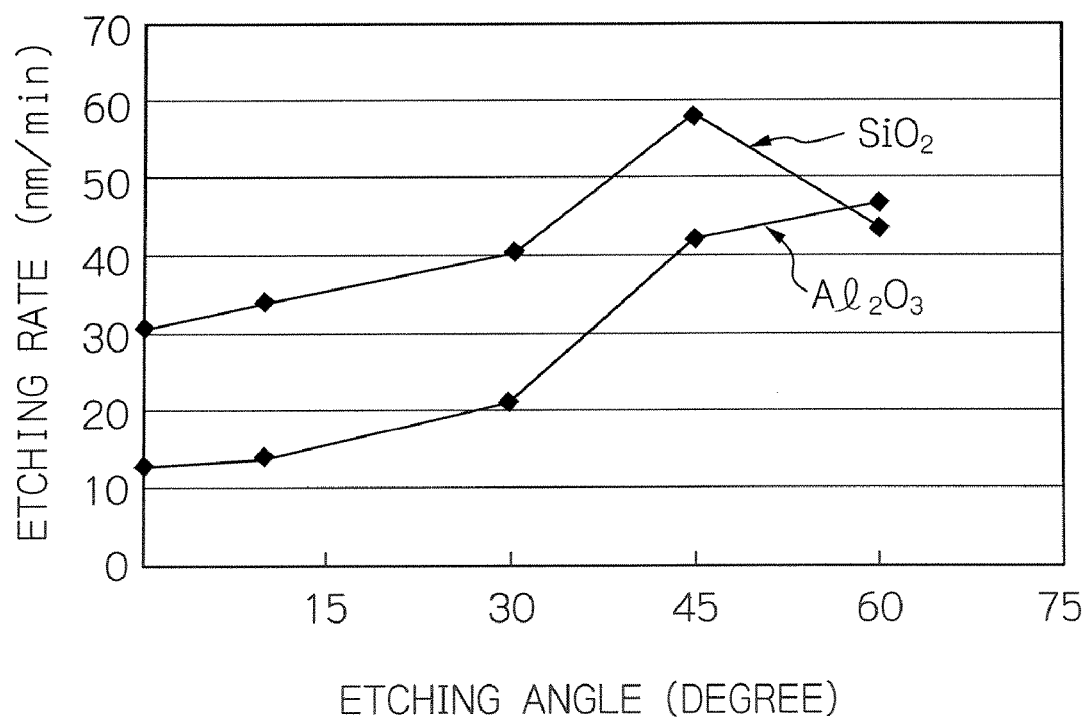
FIG. 11 shows a graph explaining the etching-angle dependence of the etching rate of the insulating film.

FIGS. 8a1 to 8c3 and FIGS. 10a1 to 10b2 show cross-sectional views and plain views illustrating an embodiment of the manufacturing steps of the MR effect multilayer and the insulating layer according to the present invention. And FIG. 9 shows a schematic view explaining the formation of the conventional insulating film, and FIG. 11 shows a graph explaining the etching-angle dependence of the etching rate of the insulating film.

First, as shown in FIGS. 8a1 and 8a2, on the lower electrode layer 330, formed sequentially by means of, for example, a sputtering technique are: a lower metal layer 50 having a thickness of approximately 1 nm to 5 nm, made of, for example, Ta, Hf, Nb, Zr, Ti, Mo or W; the base film 51 having a thickness of approximately 5 nm to 6 nm, made of, for example, NiFe or NiCr; an antiferromagnetic layer 52 having a thickness of approximately 5 nm to 15 nm, made of, for example, PtMn, NiMn, IrMn or RuRhMn; a first ferromagnetic film 53a having a thickness of approximately 2 nm, made of, for example, CoFe; a non-magnetic film 53b having a thickness of approximately 0.8 nm, made of Ru, Rh, Ir, Cr, Re or Cu, or an alloy of at least two selected from these elements; and a second ferromagnetic film 53c having a thickness of approximately 2 nm to 3 nm, made of, for example, CoFe.

Next, a metal film having a thickness of approximately 0.5 nm to 0.6 nm, made of, for example, Al or Mg is formed on the formed second ferromagnetic film 53c by means of, for example, a sputtering technique. Next, this metal film is oxidized naturally or in an atmosphere of a vacuum equipment containing oxygen molecules, oxygen atoms, oxygen ions, ozone ($O_3$) or dinitrogen oxide ($N_2O$) to become a tunnel barrier layer 54. Then, a high polarizability film 55a having a thickness of approximately 1 nm, made of, for example, CoFe, a soft magnetic film 55b having a thickness of approximately 3 nm, made of, for example, NiFe, and an upper metal layer 56 having a thickness of approximately 16 nm to 20 nm, made of, for example, Ta, Hf, Nb, Zr, Ti, Mo or W are sequentially formed on the formed tunnel barrier layer 54 by means of, for example, a sputtering technique.

Though not shown in the figure, when an in-stack bias multilayer is provided between the free layer 55 and the upper metal layer 56 as described above, a bias non-magnetic layer having a thickness of approximately 1 nm, made of, for example, Ta, Hf, Nb, Zr, Ti, Mo, W, Ru, Rh, Ir, Cr, Re, Cu, Pt, Au, Ag, Al, Si or an alloy of at least two selected from these elements, a bias ferromagnetic layer having a thickness of approximately 5 nm, made of, for example, CoFe, and a bias antiferromagnetic layer having a thickness of approximately 7 nm, made of, for example, IrMn are sequentially stacked on the soft magnetic film 55b by means of, for example, a sputtering technique.

The materials and the thicknesses of the antiferromagnetic layer 52, the pinned layer 53, the tunnel barrier layer 54 and the free layer 55 are not limited to those described above, but various materials and thicknesses may be applied. For example, the pinned layer 53 may have a single layer structure of a ferromagnetic film or a double or at least four-layered structure instead of the three-layered structure. Moreover, the free layer 55 may have a single layer structure without any high polarizability film, or an at least three-layered structure including a film for adjusting magnetic distortion. Further, the depositions of a major part of the MR effect multilayer may be performed in reverse sequence, that is, in the order of the free layer, the tunnel barrier layer, the pinned layer and the antiferromagnetic layer.

Next, after a photoresist pattern for such as a lift-off process is formed on the upper metal layer 56 (or the bias antiferromagnetic layer), an MR effect multilayered portion 332' is formed by means of, for example, an ion milling technique using the photoresist pattern as masks. Then, as shown in FIGS. 8b1 and 8b2, after an insulating film and a hard-magnetic film are formed thereon, an insulating layer 80 and a hard-bias layer 81 for biasing in the track width direction are formed by removing the photoresist pattern, that is, by a lift-off technique. Here, when an insulating film is deposited instead of the hard-magnetic film to be the hard-magnetic layer 81, the insulating film and the insulating layer 80 constitutes the insulating layer 333.

Further, as described above, a side soft-magnetic layer made of, for example, NiFe may be provided instead of the hard-magnetic layer 81. A side insulating film, which is necessary in that case, may be formed of an insulating material such as $Al_2O_3$.

After that, a photoresist pattern 82 is formed on the MR effect multilayered portion 332' and the hard-magnetic layer 81, and then, the MR effect multilayer 332 is formed by further etching the MR effect multilayered portion 332' by means of, for example, an ion milling technique using the photoresist pattern 82 as masks. Then, as shown in 8c1, the wafer substrate 83 on which the photoresist pattern 82 lies is rotated around a center axis 84 extending in the direction perpendicular to the element-formed surface of the wafer substrate 83. The central axis 84 is tilted with 20° (degrees) to 60° in relation to a normal line 86 to the surface 85 of a sputtering target. In these positional conditions of the wafer substrate 83 and the sputtering target, as shown in FIGS. 8c2 and 8c3, an insulating film 333' is deposited by means of, for example, an ion beam sputtering. Here, it should be noted that FIG. 8c2 shows a cross-sectional view taken along line D-D shown in FIG. 8c3, viewed from the different direction from that of FIG. 8b1 as a cross-sectional view taken along line C-C shown in FIG. 8b2. Further, in FIG. 8c3, a width $W_{MR}$ becomes a width in the track width direction of the MR effect element, and planes 87 and 88 become a MR height end surface just before the MR height process and a head end surface on the ABS side finished in the MR height process respectively.

The insulating film 333' formed by the above-described way has an almost uniform profile near the respective MR effect multilayers 332 aligned on the whole element-formed surface of the wafer substrate 83. In the profile, an influential factor for determining a slope angle of a portion surrounding the MR effect multilayer 332 of the insulating film 333', that is, a slope angle of a surface 1001 shown in FIG. 10a1, is a tilt angle of the center axis 84. Actually, the tilt angle is preferably from 20° to 60° as described later.

On the contrary, when the insulating layer is formed without the tilt of the wafer substrate 83, a variation or a nonuniform distribution occurs in the thickness of the insulating film 333" deposited on the wafer substrate, for example, as shown in FIG. 9. Therefore, it is understood that the tilt with an appropriate angle of the center axis 84 as a rotational axis of the wafer substrate significantly effects a uniform profile of the insulating film 333'.

In the deposition of the insulating film after forming the MR effect multilayer 332, the insulating film may be deposited by means of a CVD technique on the lower electrode layer and the side surfaces of the MR effect multilayer. In that case, the formed insulating film also has an almost uniform profile near the respective MR effect multilayers 332 aligned on the whole element-formed surface of the wafer substrate 83.

After the insulating film 333' having an almost uniform profile is formed, as shown in FIG. 10a1, the insulating film 333' is etched by ion beams 1000 in the direction along the center axis 84. The etching method in this case may be an ion milling, a reverse sputtering or a gas cluster milling. As shown in FIGS. 10a2 and 10a3, the insulating layer 333 having the concave portions 333a is formed by the etching method.

Hereinafter, the reason why the concave portions can be formed will be explained. As shown in FIG. 11, the etching rate of a representative insulating material film such as $Al_2O_3$ or $SiO_2$ is strongly dependent on an angle between the normal line to the film surface and the direction of the incident ion beam for etching, that is, etching angle. When the etching angle is from 30° (degrees) to 60°, the etching rate becomes considerably larger than that in the case with the etching angle less than 30°. Therefore, the surface 1001 of the insulating film 333' shown in FIG. 10a1 is etched at a considerably larger rate than the surface 1002, and as a result, concave shapes can be obtained as shown in FIG. 10a2. In the process, an influential factor for determining the shape of the concave portion 333a is a slope angle of the surface 1001 equivalent to the etching angle, and an influential factor for determining the slope angle is a tilt angle of the center axis 84 as described above. Actually, it has been confirmed experimentally that the tilt angle is preferably from 20° to 60°.

Next, as shown in FIGS. 10b1 and 10b2, the upper electrode layer 340 and the back flux-guide portions 340a are formed on the MR effect multilayer 332 and the insulating layer 333. The concave portion 333a and the back flux-guide portion 340a positioned on one side of the MR effect multilayer 332 are vanished by polishing during the following MR height process, as the step 10 shown in FIG. 6. Here, it should be noted that FIGS. 10a2 and 10b1 show cross-sectional views taken along line E-E shown in FIG. 10a3 and along line F-F shown in FIG. 10b2 respectively, viewed from the same direction as each other.

Further, even in the case in which an MR effect element including the CPP-GMR effect multilayer is formed, the above-described manufacturing method can be applied except the forming step of the multilayered structure shown in FIGS. 8a1 and 8a2.

Hereinafter, explained are some practical examples of the MR effect element according to the present invention, and the effect of concave portions with various sizes and positional relations to the MR effect multilayer.

FIGS. 12a and 12b show cross-sectional views explaining distance parameters defining the position and the size of the concave portion in the practical examples of the MR effect element according to the present invention and the comparative examples.

As shown in FIG. 12a, the bottom point (the lowest point of the concave) of a concave portion 1200a is positioned at the same level or a lower level in the stacking direction compared to the upper surface of a free layer 1201. Here, a distance (thickness) in the rear-front direction from the rear end of the upper surface of the free layer 1201 to the concave surface of the concave portion 1200a is defined as $D_I$, and the distance (thickness) in the stacking direction from the lower surface 1202 of an insulating layer 1200 to the bottom point of the concave portion 1200a is defined as $D_B$. Further, the distance in the stacking direction from the lower surface 1202 of the insulating layer 1200 to the upper surface of the free layer 1201 is defined as $D_F$, and the layer thickness of the insulating layer 1200 except the concave portion 1200a and the portion surrounding the MR effect multilayer is defined as $T_I$. In this case, the relation of $D_B \leqq D_F$ is satisfied from the configuration according to the present invention, and the relation of $D_B < T_I$ is obviously satisfied because the concave portion is provided in the insulating layer.

As shown in FIG. 12b, in the comparative example of the MR effect element, the bottom point of a concave portion 1203a is positioned at an upper level in the stacking direction compared to the upper surface of a free layer 1204. In that case, $D_B$ becomes larger than $D_F$ ($D_B > D_F$), and the distance $D_I$ cannot be determined. Here, the $D_I$ value in this case is defined as infinite in the sense that a back flux-guide effect cannot be substantially obtained, that is, $1/D_I$ is defined as zero.

Here, samples of the practical examples of the MR effect element according to the present invention and the comparative examples will be explained below. In all the samples, an MR effect multilayer was formed on the lower electrode layer. The MR effect multilayer was a TMR effect multilayer, and was formed by etching, with a photolithography technique and an ion milling technique, a multilayer which is formed by sequentially depositing a Ta film with thickness of 1 nm, a NiCr film with thickness of 6 nm, an IrMn film with thickness of 7 nm, CoFe, Ru and CoFe films to be a pinned layer with thickness of 2 nm, 0.8 nm and 2.5 nm respectively, an $Al_2O_3$ film to be a tunnel barrier layer with thickness of 3 nm, CoFe and NiFe films to be a free layer with thickness of 3 nm and 1 nm respectively, and a Ta film with thickness of 18 nm. In the samples, the etching depth by the ion milling was larger than the height of the MR effect multilayer, that is to say, the etching process was an overetching one. Therefore, the distance $D_F$ becomes 30 nm by the addition of the overetching depth.

Next, an insulating layer made of $Al_2O_3$ with thickness of approximately 50 nm was formed on the side of the rear side surface of the MR effect multilayer by using the manufacturing method shown in FIG. 8c1. In the method, the angle between the normal line to the element-formed surface of the wafer substrate and the normal line to the surface of the sputtering target was 40° (degrees), and the deposition rate was 0.07 nm/sec. After that, as shown in FIG. 10a1, the insulating layer made of $Al_2O_3$ was etched by means of a reverse sputtering. As a result, a concave portion was formed near the rear side surface of the MR effect multilayer. Further, the slope angle of a portion surrounding the MR effect multilayer of the insulating layer became approximately 30° (degrees). Finally, the samples of the MR effect element were completed by forming an upper electrode layer on the MR effect multilayer and the insulating layer.

The examples according to the present invention and the comparative samples having the concave portions with various sizes and positions can be obtained by adjusting the etching time of the insulating layer.

Figure 13A:
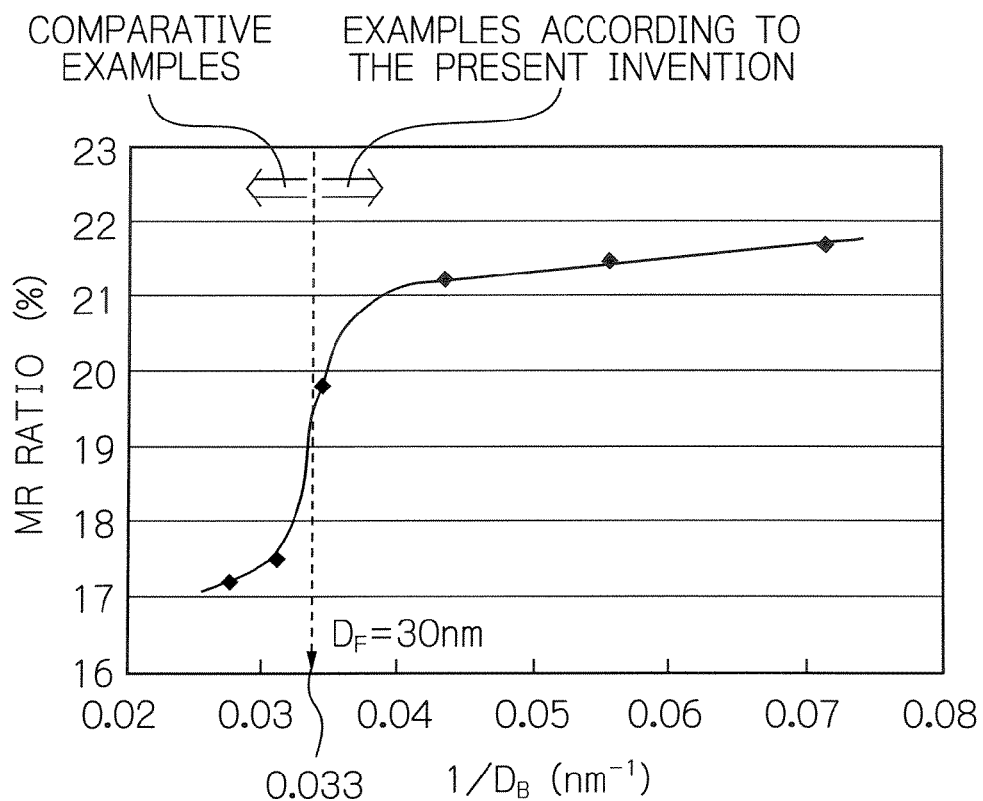
FIG. 13a shows a graph of the relation between the distance $D_B$ and the MR ratio in the practical examples of the MR effect element according to the present invention and the comparative examples.

FIG. 13a shows a graph of the relation between the distance $D_B$ and the MR ratio in the practical examples of the MR effect element according to the present invention and the comparative examples. In the figure, the horizontal axis is $1/D_B$ ($nm^{-1}$). The determination of the MR ratio was performed by measuring a voltage between the upper and lower electrode layers under the condition of applying an external field from the opposite side to the concave portion in relation to the MR effect element (from the front side) and applying a sense current between the upper and lower electrode layers. Further, each of the measured values of the MR ratio is an average value of 40 samples with the same $D_B$ value.

As shown in FIG. 13a, data on the right side in relation to an inflection point of the graph curve at $1/D_B=0.033$ $nm^{-1}$ ($D_B=30$ nm) equivalent to the $D_F$ value of 30 nm correspond to the examples according to the present invention which have sufficiently lower bottom points of the concave portions. They have MR ratios of approximately 20% (percents) or more, exhibiting the stable and sufficient TMR effect. Further, in the region that $1/D_B$ is 0.043 $nm^{-1}$ or more ($D_B$ is 23 nm or less), the MR ratio becomes stable on the order of 21%. On the contrary, the comparative examples that have rather high bottom points of the concave portions on the left side of the inflection point, have MR ratios of much less than 20%, showing much lower MR ratio as the bottom point becomes higher (as $1/D_B$ becomes smaller). Therefore, it is understood that the MR effect element according to the present invention obtains the favorable back flux-guide effect to sufficiently bring out the intrinsic MR effect of the element, because the bottom point of the concave portion is positioned at the same level or a lower level compared to the upper surface of the free layer.

Figure 13B:
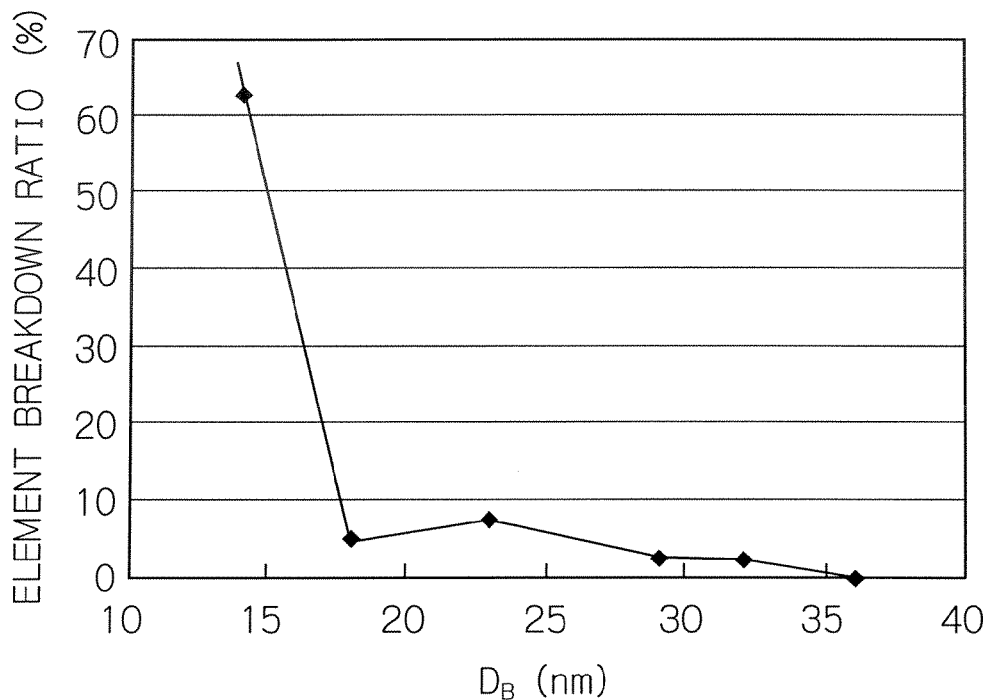
FIG. 13b shows a graph of the relation between the distance $D_B$ and the element breakdown ratio in the practical examples of the MR effect element according to the present invention and the comparative examples.

FIG. 13b shows a graph of the relation between the distance $D_B$ and the element breakdown ratio in the practical examples of the MR effect element according to the present invention and the comparative examples. In those samples, the area of the layer surface of the MR effect multilayer was approximately 0.1 $\mu m^2$, and the intrinsic withstand voltage between the upper and lower electrode layers was approximately 800 mV. In the breakdown measurement, the occurrence of the breakdown in the insulating layer was determined under the condition of applying a voltage of 400 mV considerably larger than the usual voltage of approximately 150 mV between the upper and lower electrode layers. The element breakdown ratio was derived from the number of breakdown samples out of the 40 samples with the same $D_B$.

As shown in FIG. 13b, the examples having $D_B$ of 18 nm or more show the element breakdown ratios of less than 10%, however, the breakdown ratio is rapidly increased as $D_B$ decreases to less than 18 μm (micrometers), and becomes more than 60% at $D_B$ of 14 nm. The rapid increase in the element breakdown ratio is thought to be caused by the ESD phenomenon that is likely to occur due to charges induced between the portion in the concave of the upper electrode layer and the lower electrode lower under the condition of smaller $D_B$. Therefore, it is preferable that the distance $D_B$ is 18 nm or more. From the results including that of FIG. 13a, it is evident that the preferable range of the distance $D_B$ is 18 nm $\leq D_B$ (nm) $\leq D_F$ (nm).

Figure 14:
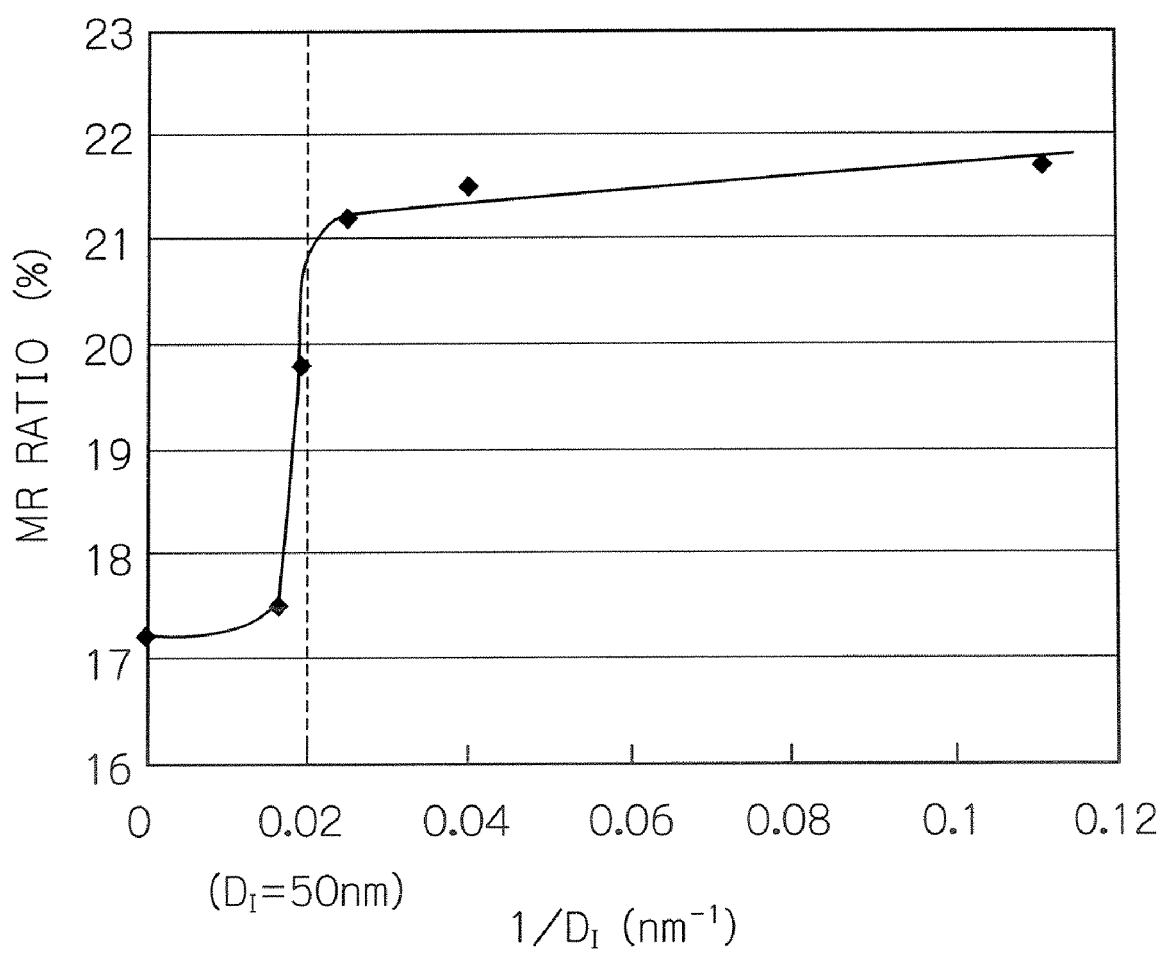
FIG. 14 shows a graph of the relation between the distance $D_f$ and the MR ratio in the practical examples of the MR effect element according to the present invention and the comparative examples.
Figure 15:
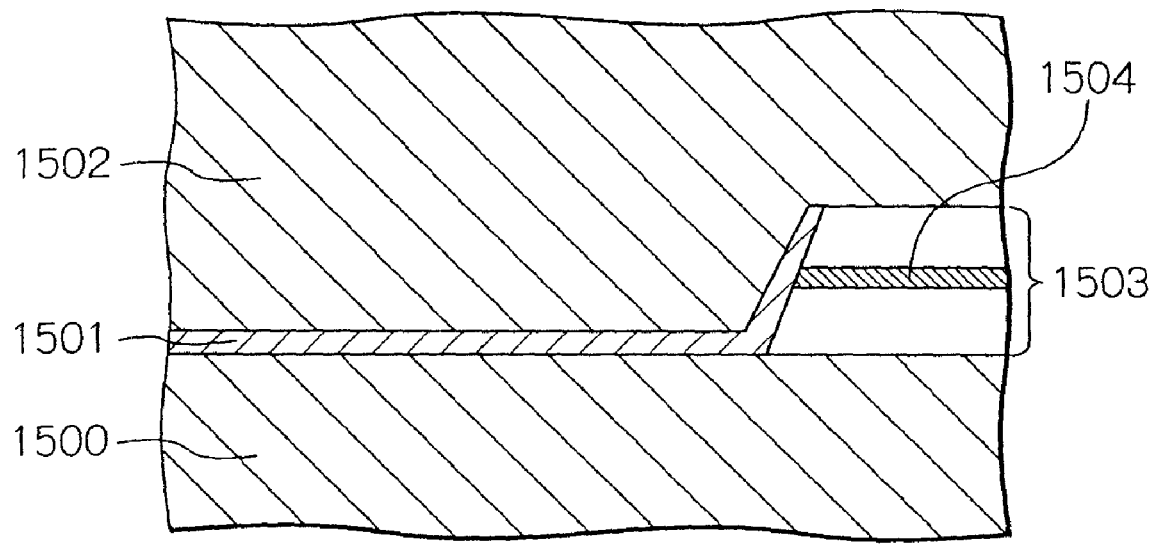
FIG. 15 shows an embodiment described in U.S. Pat. No. 6,381,107.

FIG. 14 shows a graph of the relation between the distance $D_I$ and the MR ratio in the practical examples of the MR effect element according to the present invention and the comparative examples. In the figure, the horizontal axis is $1/D_I$ (nm$^{-1}$), and the $1/D_I$ value is set to be zero in the case of FIG. 12b as described above.

As shown in FIG. 14, the examples having $1/D_I$ of 0.02 nm$^{-1}$ or more ($D_I$ of 50 nm or less) show the sufficiently large MR ratios on the order of 20%. The large MR ratio is thought to be caused by the favorable back flux-guide effect to sufficiently bring out the intrinsic MR effect of the element under the condition that the concave portion is adequately close to the free layer. On the contrary, the MR ratio is rapidly decreased as $1/D_I$ decreases to less than 0.02 nm$^{-1}$ that corresponds an inflection point of the graph curve and is equivalent to $D_I$=50 nm. Therefore, it is preferable that the $D_I$ value is 50 nm or less to obtain the favorable back flux-guide effect. Meanwhile, the portion surrounding the MR effect multilayer of the insulating layer is required to effectively isolate the rear surface of the MR effect multilayer from the upper electrode layer. Actually, it has been confirmed experimentally that the $D_I$ value is needed to be at least 3 nm to prevent short-circuiting surely. Therefore, it is evident that the preferable range of the distance $D_I$ is 3 nm $\leq D_I$ (nm) $\leq$ 50 nm.

All the foregoing embodiments are by way of example of the present invention only and not intended to be limiting, and many widely different alternations and modifications of the present invention may be constructed without departing from the spirit and scope of the present invention. Actually, the MR effect element according to the present invention can be also applied to a magnetic field sensitive part of magnetic sensors, magnetic switches and magnetic encoders. Accordingly, the present invention is limited only as defined in the following claims and equivalents thereto.

The invention claimed is:

1. A manufacturing method of a thin-film magnetic head wafer comprising steps of:
    forming, on a lower electrode layer, a magnetoresistive effect multilayer having a non-magnetic intermediate layer, said non-magnetic intermediate layer being sandwiched between a pinned layer and a free layer, by etching with a photoresist pattern as masks;
    depositing an insulating film on said lower electrode layer and a side surface of said magnetoresistive effect multilayer by a sputtering, during rotating a wafer substrate on which said photoresist pattern lies around a center axis extending in a direction perpendicular to an element-formed surface of said wafer substrate, said center axis tilted with a predetermined angle in relation to a normal line to a surface of a sputtering target;
    etching said insulating film by a means including an ion beam etching or a reverse sputtering to form an insulating layer having a concave portion near the side surface of said magnetoresistive effect multilayer; and
    forming an upper electrode layer on said insulating layer including said concave portion and said magnetoresistive effect multilayer.

2. The manufacturing method as claimed in claim 1, wherein said predetermined angle is in a range from 20 degrees to 60 degrees.

3. The manufacturing method as claimed in claim 1, wherein said insulating film is made of an alumina or a silicon dioxide.

4. A manufacturing method of a thin-film magnetic head comprising steps of:
    forming a thin-film magnetic head wafer by a manufacturing method comprising:
    forming, on a lower electrode layer, a magnetoresistive effect multilayer having a non-magnetic intermediate layer, said non-magnetic intermediate layer being sandwiched between a pinned layer and a free layer, by etching with a resist photoresist pattern as masks;
    depositing an insulating film on said lower electrode layer and a side surface of said magnetoresistive effect multilayer by a sputtering, during rotating a wafer substrate on which said photoresist pattern lies around a center axis extending in a direction perpendicular to an element-formed surface of said wafer substrate, said center axis tilted with a predetermined angle in relation to a normal line to a surface of a sputtering target;
    etching said insulating film by a means including an ion beam etching or a reverse sputtering to form an insulating layer having a concave portion near the side surface of said magnetoresistive effect multilayer; forming an upper electrode layer on said insulating layer including said concave portion and said magnetoresistive effect multilayer;
    cutting said thin-film magnetic head wafer into row bars on which a plurality of thin-film magnetic heads is aligned; and
    polishing the row bar for adjusting an MR height; and cutting the polished row bar into individual thin-film magnetic heads.

5. The manufacturing method as claimed in claim 4, wherein said predetermined angle is in a range from 20 degrees to 60 degrees.

6. The manufacturing method as claimed in claim 4, wherein said insulating film is made of an alumina or a silicon dioxide.

* * * * *